United States Patent
Blatt

(10) Patent No.: US 11,923,962 B2
(45) Date of Patent: Mar. 5, 2024

(54) SYSTEMS AND METHODS FOR CALIBRATING GROUND STATIONS

(71) Applicant: Viasat Inc., Carlsbad, CA (US)

(72) Inventor: Roy Blatt, Atlanta, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 18/032,335

(22) PCT Filed: Oct. 15, 2021

(86) PCT No.: PCT/US2021/055255
§ 371 (c)(1),
(2) Date: Apr. 17, 2023

(87) PCT Pub. No.: WO2022/082026
PCT Pub. Date: Apr. 21, 2022

(65) Prior Publication Data
US 2023/0291466 A1 Sep. 14, 2023

Related U.S. Application Data

(60) Provisional application No. 63/092,884, filed on Oct. 16, 2020.

(51) Int. Cl.
*H04B 7/185* (2006.01)
*H04B 7/19* (2006.01)

(52) U.S. Cl.
CPC ........ *H04B 7/18517* (2013.01); *H04B 7/19* (2013.01)

(58) Field of Classification Search
None
See application file for complete search history.

(56) References Cited

U.S. PATENT DOCUMENTS

| | | | |
|---|---|---|---|
| 7,242,910 B2* | 7/2007 | Peterson, III | H03J 1/0075 455/75 |
| 2016/0365629 A1* | 12/2016 | Yao | H01Q 1/1257 |
| 2019/0170846 A1* | 6/2019 | Rose | G01S 3/023 |

FOREIGN PATENT DOCUMENTS

CN 111342882 A 6/2020

OTHER PUBLICATIONS

International Search Report and Written Opinion, PCT/US2021/055255, dated Feb. 11, 2022, 10 pages.

* cited by examiner

*Primary Examiner* — Shripal K Khajuria
(74) *Attorney, Agent, or Firm* — Holland & Hart LLP

(57) ABSTRACT

A geosynchronous equatorial orbit (GEO) ground station may concurrently receive at a tracking receiver both a first signal (downlink data) at a first frequency from a GEO satellite and an internally-generated calibration signal at a second frequency. Based on the calibration signal, the tracking receiver may determine a first phase value for the second frequency, then, from the first phase value, determine a second phase value associated with the first frequency based on a first phase offset between the first frequency and the second frequency according to a set of receiver calibration factors, then generate a phase correction value for signals received at the first frequency without interrupting the downlink data coming from the GEO satellite. Having accurate phasing allows the tracking receiver to report tracking errors correctly to the antenna controller and therefore allow for improved tracking performance.

24 Claims, 8 Drawing Sheets

SYSTEMS AND METHODS FOR CALIBRATING GROUND STATIONS

CROSS-REFERENCES

The present Application for Patent is a 371 national phase filing for International Patent Application No. PCT/US2021/055255 by BLATT, entitled "SYSTEMS AND METHODS FOR CALIBRATING GROUND STATIONS" filed Oct. 15, 2021, which claims the benefit of U.S. Provisional Application No. 63/092,884 titled "SYSTEMS AND METHODS FOR CALIBRATING GEO GROUND STATIONS," filed Oct. 16, 2020, each of which is assigned to the assignee hereof, and each of which is expressly incorporated by reference in its entirety herein.

BACKGROUND

The following relates generally to communications, including systems and method for calibrating ground stations (e.g., geosynchronous equatorial orbit (GEO) ground stations). A ground station may communicate with a satellite according to a particular communication frequency (e.g., a radio frequency (RF) carrier frequency). The ground station may perform frequency tracking for downlink and uplink communications with the satellite. Some satellite tracking systems may use a labor intensive phase matching process between multiple RF paths. RF cables of the RF paths may be trimmed in length, and manual phase shifters adjusted in the field. Furthermore, amplifiers used in the RF paths may be matched to a reference. Changes in temperature may change the phase of the amplifiers, and the phase shift introduced by the amplifiers may also shift over time. In addition, long and expensive RF cables may be run alongside the antenna for providing tracking signals. The cables may be damaged in the field. As such, tracking techniques at the communication frequency may be used to eliminate requirements for phase matched components, manual phase shifters/adjustments, or labor intensive RF cable trimming. However, such techniques may need to be periodically performed, but require a pause or halt of communications on the communications frequency in order to perform tracking.

SUMMARY

The described techniques relate to improved methods, systems, devices, and apparatuses that support satellite operations. A ground station (e.g., a geosynchronous equatorial orbit (GEO) ground station) may implement a tracking system that includes a tracking receiver. The tracking receiver may concurrently receive at both a first signal at a first frequency and a calibration signal at a second frequency via a first path and a second path, and a calibration signal at a second frequency. The first signal may be a communication signal received via an antenna of the ground station. The calibration signal may be output by the tracking receiver, the calibration signal coupled with the first path and the second path. Based on the calibration signal, the tracking receiver may determine a first phase value for the second frequency. Then, from the first phase value, the tracking receiver may determine a second phase value associated with the first frequency based on a first phase offset between the first frequency and the second frequency based on a set of receiver calibration factors, then generate a phase correction value for signals received at the first frequency. Difference in phase may also exist due to different path lengths between a first receiver of the tracking receiver that is configured to receive the communications signal and a second receiver of the tracking receiver that is configured to receive the calibration signal. During calibration, the tracking receiver may calibrate for these differences based on a phase offset identified by the set of receiver calibration factors. By performing calibration on a second frequency different than the frequency used for the communications signal, the tracking receiver may perform calibration for tracking without interrupting the communications signal, thereby providing a more accurate tracking error signal and improving overall system tracking. In some examples, having accurate phasing allows the tracking receiver to report tracking errors correctly to the antenna controller and therefore allow for improved tracking performance.

During a characterization phase for the tracking system, for example during or shortly following installation or deployment of the ground station, the tracking receiver may use a set of different frequencies to generate the set of receiver calibration factors. The tracking receiver may output calibration signals over each frequency of the set of frequencies, and determine the phase for each frequency. The tracking receiver perform the calibration for each receiver of the tracking receiver, for example to account for differences between the receivers of the tracking receiver. Values indicating the different calibration factors of the set of receiver calibration factors may be represented and stored at the tracking receiver. Characterization of the tracking system may allow a calibration signal of a different frequency to be used to determine the phase for the communication signal.

DETAILED DESCRIPTION

Figure 1:
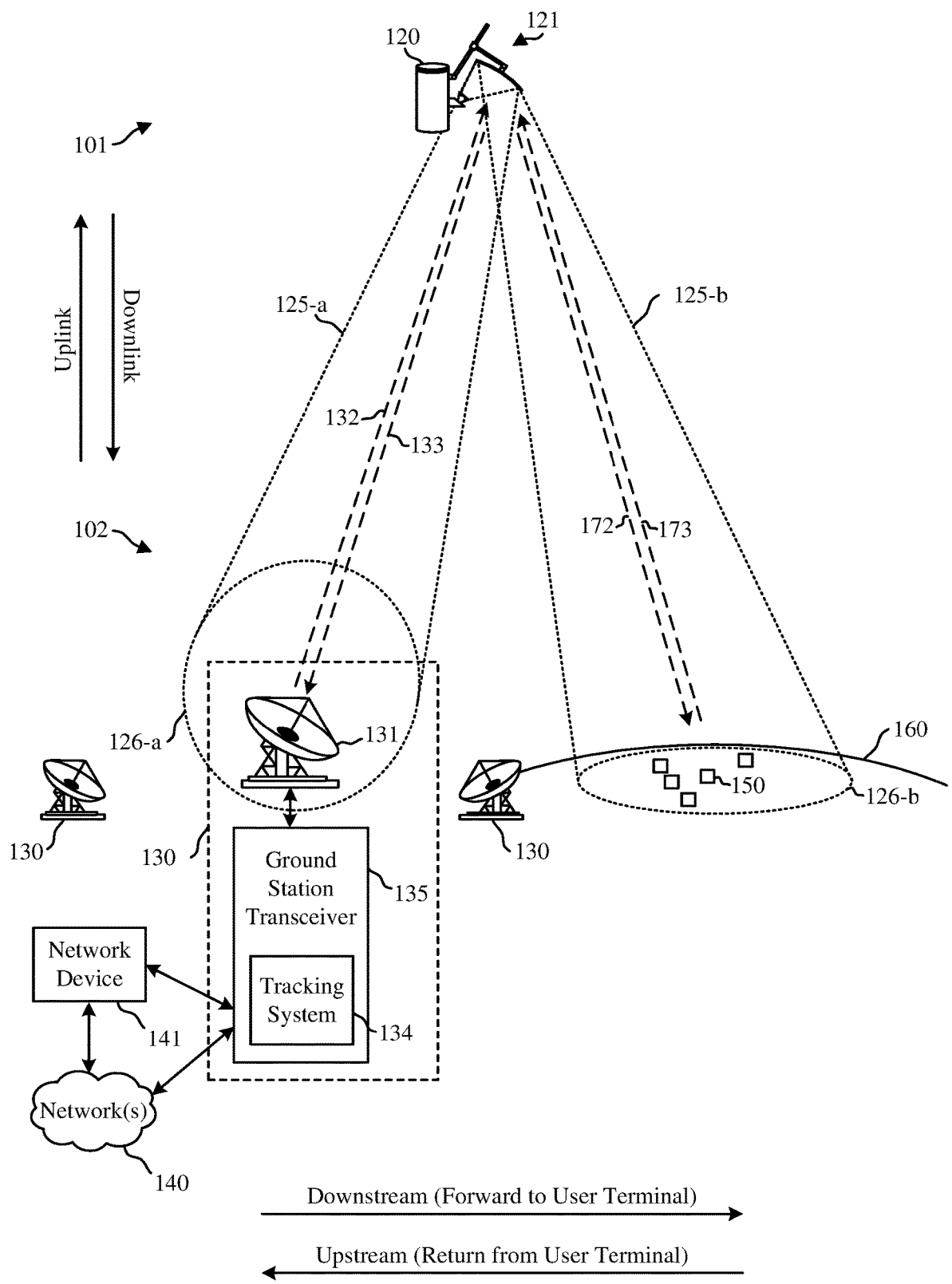
FIG. 1 illustrates an example of a satellite communications system that supports systems and method for calibrating ground stations in accordance with aspects described herein.

A ground station may implement a tracking system that includes a tracking receiver. In some example, the ground station may be a geosynchronous equatorial orbit (GEO) ground station. The tracking system may require calibration of phase differences in the signal paths of the antenna to the ground station transceiver, including the tracking transceiver. Initial phase calibration may be performed in connection with the installation and setup of the tracking system at a particular temperature. However, changes in temperature and shifts caused over durations of time may impact the phase for different signal paths, and between signal paths and calibration paths. Certain techniques may allow for periodic or intermittent calibration procedure, but such procedure may interrupt the reception of communications signals, decreasing throughput and overall communications performance. Systems and methods to track a calibration signal on a different frequency than the frequency of the communication signal may allow for uninterrupted receipt of the communications signals. A characterization procedure may be performed during or shortly after installation to determine receiver calibration factors that can be used to determine phase at the communication frequency from the phase determined at the calibration frequency.

A tracking receiver may concurrently receive both a first signal at a first frequency and a calibration signal at a second frequency via a first path and a second path. The first signal may be a communication signal received via an antenna of the ground station. The calibration signal may be output by the tracking receiver and coupled with the first path and the second path. Based on the calibration signal, the tracking receiver may determine a first phase value for the second frequency. Then, from the first phase value, the tracking receiver may determine a second phase value associated with the first frequency based on a first phase offset between the first frequency and the second frequency based on a set of receiver calibration factors, then generate a phase correction value for signals received at the first frequency. Difference in phase may also exist due to difference between a first receiver of the tracking receiver that is configured to receive the communications signal and a second receiver of the tracking receiver that is configured to receive the calibration signal. During calibration, the tracking receiver may calibrate for these differences based on a phase offset identified by the set of receiver calibration factors. By performing calibration on a second frequency different than the frequency used for the communications signal, the tracking receiver may perform calibration for tracking without interrupting the communications signal, thereby improving throughput.

During a characterization phase for the tracking system, for example during or shortly following installation or deployment of the ground station, the tracking receiver may use a set of different frequencies to generate the set of receiver calibration factors. The tracking receiver may output calibration signals over each frequency of the set of frequencies, and determine the phase for each frequency. The tracking receiver perform the calibration for each receiver of the tracking receiver, for example to account for differences between the receivers of the tracking receiver. Values indicating the different calibration factors of the set of receiver calibration factors may be represented and stored at the tracking receiver. For example the values indicating the different calibration factors may be, indicate, or otherwise represent a slope parameter and offset parameter for a linear best fit of the obtained phase versus frequency data during the characterization phase. Characterization of the tracking system may allow a calibration signal of a different frequency to be used to determine the phase for the communication signal.

Features of the disclosure are initially described in the context of a satellite communications system as described with reference to FIGS. 1 and 2. Features of the disclosure are described in the context of tracking systems, tracking receivers, and antenna systems as described with reference to FIGS. 3-5C. These and other features of the disclosure are further illustrated by and described with reference to an apparatus diagram and flowcharts that relate to systems and method for calibrating ground stations (e.g., GEO ground stations) as described with reference to FIGS. 6-8.

FIG. 1 shows an example of a satellite communications system 100 that supports systems and method for calibrating ground stations in accordance with aspects described herein. Satellite communications system 100 may use a number of network architectures including a space segment 101 and ground segment 102. The space segment 101 may include one or more satellites 120. The ground segment 102 may include one or more ground stations 130 (e.g., gateway terminals, ground stations), as well as network devices 141 such as network operations centers (NOCs), satellite and gateway terminal command centers, or other central processing centers or devices. Although grounds stations 130 are discussed, in other examples, the techniques described herein may be applied to other devices, such as other access node terminals (e.g., a gateway terminal). Network device(s) 141 may be coupled with the ground station 130 and may control aspects of the communications system 100. In various examples a network device 141 may be co-located or otherwise nearby the ground station 130 or may be a remote installation that communicates with the ground station 130 and/or network(s) 140 via wired and/or wireless communications link(s). In some examples, the ground segment 102 may also include user terminals 150 that are provided a communications service via a satellite 120.

User terminals 150 may include various devices configured to communicate signals with the satellite 120, which may include fixed terminals (e.g., ground based stationary terminals) or mobile terminals such as terminals on boats, aircraft, ground based vehicles, and the like. A user terminal 150 may communicate data and information with A ground station 130 via the satellite 120. The data and information may be communicated with a destination device such as a network device 141, or some other device or distributed server associated with a network 140.

A ground station 130 may transmit forward uplink signals 132 to satellite 120 and receive return downlink signals 133 from satellite 120. Ground stations 130 be examples of access nodes, and may also be known as gateways, gateway terminals, or hubs. A ground station 130 may include a ground station antenna system 131 and a ground station transceiver 135. The ground station transceiver 135 may include a tracking system 134. The ground station antenna system 131 may be two-way capable and designed with adequate transmit power and receive sensitivity to communicate reliably with the satellite 120. In some examples, ground station antenna system 131 may comprise a parabolic reflector with high directivity in the direction of a satellite 120 and low directivity in other directions. Ground station antenna system 131 may comprise a variety of alternative configurations and include operating features such as high isolation between orthogonal polarizations, high efficiency in the operational frequency bands, low noise, and the like.

When supporting a communications service, A ground station 130 may schedule traffic to user terminals 150. Alternatively, such scheduling may be performed in other parts of a communications system 100 (e.g., at one or more network devices 141, which may include network operations centers (NOC) and/or gateway command centers). Although one ground station 130 is shown in FIG. 1, examples in accordance with the present disclosure may be implemented in communications systems having a plurality of ground stations 130, each of which may be coupled to each other and/or one or more networks 140.

A ground station 130 may provide an interface between the network 140 and the satellite 120 and, in some examples, may be configured to receive data and information directed between the network 140 and one or more user terminals 150. Ground station 130 may format the data and information for delivery to respective user terminals 150. Similarly, ground station 130 may be configured to receive signals from the satellite 120 (e.g., from one or more user terminals 150) directed to a destination accessible via network 140. Ground station 130 may also format the received signals for transmission on network 140.

The network(s) 140 may be any type of network and can include, for example, the Internet, an internet protocol (IP) network, an intranet, a wide area network (WAN), a metropolitan area network (MAN), a local area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network(s) 140 may include both wired and wireless connections as well as optical links. Network(s) 140 may connect the ground station 130 with other access node terminals that may be in communication with the same satellite 120 or with different satellites 120 or other vehicles.

A satellite 120 may be configured to support wireless communications between one or more ground stations 130 and/or various user terminals 150 located in a service coverage area. In some examples, the satellite 120 may be deployed and operate in a GEO, such that its orbital position with respect to terrestrial devices is relatively fixed or fixed within an operational tolerance or other orbital window (e.g., within an orbital slot). In other examples, the satellite 120 may operate in any appropriate orbit (e.g., low Earth orbit (LEO), medium Earth orbit (MEO), etc.).

The satellite 120 may include an antenna assembly 121 having one or more antenna feed elements. Each of the antenna feed elements may include, for example, a feed horn, a polarization transducer (e.g., a septum polarized horn, which may function as two combined elements with different polarizations), a multi-port multi band horn (e.g., dual band 20 GHz/30 GHz with dual polarization LHCP/RHCP), a cavity backed slot, an inverted-F, a slotted waveguide, a Vivaldi, a Helical, a loop, a patch, or any other configuration of an antenna element or combination of interconnected sub-elements. Each of the antenna feed elements may also include, or be otherwise coupled with, a radio frequency (RF) signal transducer, a low noise amplifier (LNA), or power amplifier (PA), and may be coupled with one or more transponders in the satellite 120. The transponders may be used to perform signal processing, such as amplification, frequency conversion, beamforming, and the like.

In some embodiments, a Multi-Frequency Time-Division Multiple Access (MF-TDMA) scheme may be used for forward uplink signals 132 and return uplink signals 173, allowing efficient streaming of traffic while maintaining flexibility in allocating capacity among user terminals 150. In these embodiments, a number of frequency channels may be allocated in a fixed manner or, alternatively, may be allocated in a dynamic fashion. A Time Division Multiple Access (TDMA) scheme may also be employed in each frequency channel. In this scheme, each frequency channel may be divided into several timeslots that can be assigned to a connection (e.g., to a particular user terminal 150). In other embodiments, one or more of the forward uplink signals 132 and return uplink signals 173 may be configured using other schemes, such as Frequency Division Multiple Access (FDMA), Orthogonal Frequency Division Multiple Access (OFDMA), Code Division Multiple Access (CDMA), or any number of hybrid or other schemes known in the art. In various embodiments, physical layer techniques may be the same for each of forward uplink signals 132, return downlink signals 133, forward downlink signals 172, or return uplink signals 173, or some of the signals may use different physical layer techniques than other signals.

When supporting a communications service, the satellite 120 may receive forward uplink signals 132 from one or more ground stations 130 and provide corresponding forward downlink signals 172 to one or more user terminals 150. The satellite 120 may also receive return uplink signals 173 from one or more user terminals 150 and provide corresponding return downlink signals 133 to one or more ground stations 130. A variety of physical layer transmission modulation and coding techniques may be used by ground stations 130, satellite 120, and user terminals 150 for the communication of signals (e.g., adaptive coding and modulation (ACM)). A satellite 120 may include one or more transponders that may each be coupled with one or more receive elements and one or more transmit antenna elements of an antenna, forming K receive/transmit paths having different radiation patterns (e.g., by using different frequency range and polarization combinations). Each of the K receive/transmit paths may be allocated as a forward pathway or a return pathway at any instant of time.

In some examples, a satellite 120 may communicate data using a single beam for communicating with a ground station 130 (which may be referred to as a beam or a ground station beam, or for an access node more generally, as an access node beam) and a single beam for communicating with a user terminal 150 (which may be referred to as a user beam). In some examples, each of these beams covers a service area of the satellite 120, which may span a large geographic area (e.g., a half of the earth). In such cases, the ground station beam and user beam may be referred to as broad beams. Also, the communication resources (e.g., time and/or frequency resources) allocated to the communications system 100 may be shared among the user terminals 150 within the coverage area of user beam 125-b. In some examples, the communication resource may be divided among the user terminals 150 in time and/or frequency, and separate communications may be transmitted to the user terminals 150 over different communication resources. Additionally, or alternatively, multiple user terminals 150 may use the same time and frequency resources, and separate communications may be transmitted to the user terminals 150 over the same communication resources. When multiple user terminals 150 use the same time and frequency resources, a satellite communications system may apply spreading to the separate communications prior to transmission. For example, sequences (e.g., pseudorandom sequences or orthogonal code) may be applied to the separate communications before the separate communications are transmitted in a combined signal over the same time and frequency resources.

In some examples, each sequence may be assigned to a different user terminal 150. Communications that are spread using a sequence may be referred to as DSSS communications, and simultaneously transmitting transmissions for different users that have been spread using unique sequence may be an example of a CDMA technique. A user terminal 150 may determine a sequence used for communications to the user terminal 150, and apply the sequence to the combined signal to extract a component of the signal that carries a communication intended for the user terminal 150. A satellite 120 that performs CDMA communications may include multiple spreaders and one or more power amplifiers that are coupled with the spreaders and antenna elements of an antenna array. In some examples, separate data signals may be provided to respective spreaders, which may apply unique spreading codes to the data signals to obtain multiple spread signals. The spread signals may be combined and provided to one or more power amplifiers, which may provide an amplified signal to an antenna of the satellite 120.

In other examples, a satellite 120 may communicate data using multiple beams that cover a service area of the satellite 120 (e.g., to increase a capacity of a communications system). That is, the satellite 120 may communicate data using multiple beams that are arrayed or tiled to cover a service area of the satellite 120. Some satellites 120 may include several transponders, each able to independently receive and transmit signals. Each transponder may be coupled to one or more antenna elements (e.g., a receive element and a transmit antenna element) to form a receive/transmit signal path that has a different radiation pattern (antenna pattern) from the other receive/transmit signal paths to create unique beams that may be allocated to the same (e.g., using different frequency ranges or polarizations) or different beam coverage areas. In some cases, a single receive/transmit signal path may be shared across multiple beams using input and/or output multiplexers. In such cases, the number of simultaneous beams that may be formed may generally be limited by the number of receive/transmit signal paths deployed on the satellite.

In some examples, ground station beams or user beams may be obtained via beamforming (and may be referred to as "spot beams"). In such cases, ground station beam 125-a may be one of multiple ground station beams that cover a service area of the satellite 120. Similarly, user beam 125-b may be one of multiple user node beams that cover a service area of the satellite 120. Beamforming for a communication link may be performed by adjusting the signal phase (or time delay), and sometimes signal amplitude, of signals transmitted and/or received by multiple elements of one or more antenna arrays. This phase/amplitude adjustment is commonly referred to as applying "beam weights" or "beam coefficients" to the transmitted signals. For reception (by receive elements of the one or more antenna arrays), the relative phases, and sometimes amplitudes, of the received signals are adjusted (e.g., the same or different beam weights are applied) so that the energy received from a desired location by multiple receive antenna elements will constructively superpose. Within a spot beam, communication resources may be divided amongst user terminals, as similarly describe with reference to communications using broad beams. Also, in some examples, a same set of communications resources may be shared by user terminals, as similarly described with reference to communications using broad beams.

The satellite 120 may communicate with a ground station 130 by transmitting return downlink signals 133 and/or receiving forward uplink signals 132 via one or more ground station beams (e.g., ground station beam 125-a, which may be associated with a respective ground station beam coverage area 126-a). Ground station beam 125-a may, for example, support a communications service for one or more user terminals 150 (e.g., relayed by the satellite 120), or any other communications between the satellite 120 and the ground station 130. In some examples, ground station beam 125-a is one of multiple spot beams. The satellite 120 may communicate with a user terminal 150 by transmitting forward downlink signals 172 and/or receiving return uplink signals 173 via one or more user beams (e.g., user beam 125-b, which may be associated with a respective user beam coverage area 126-b). User beam 125-b may support a communications service for one or more user terminals 150 or any other communications between the satellite 120 and the user terminal 150. In some examples, user beam 125-b is one of multiple spot beams. In some examples, the satellite 120 may relay communications from a ground station 130 to user terminals 150 using one of the ground station beam 125-a or the user beam 125-b (that is, ground stations 130 and user terminals 150 may share a beam).

To support beamforming operations, the satellite 120 may use a phased array antenna assembly (e.g., direct radiating array (DRA)), a phased array fed reflector (PAFR) antenna, or any other mechanism known in the art for reception or transmission of signals (e.g., of a communications or broadcast service, or a data collection service). Phased array antenna assemblies may be employed for both receiving uplink signals (e.g., forward uplink signal 132, return uplink signal 173, or both) and transmitting downlink signals (e.g., return downlink signal 133, forward downlink signal 172, or both). Relatively large reflectors may be illuminated by a phased array of antenna feed elements, supporting an ability to make various patterns of spot beams within the constraints set by the size of the reflector and the number and placement of the antenna feed elements.

Each of the antenna feed elements may also include, or be otherwise coupled with an RF signal transducer, an LNA, a phase shifter, or PA, and may be coupled with one or more transponders in the satellite 120 that may perform other signal processing such as frequency conversion, beamforming processing, and the like. In some examples, each phase shifter may be coupled with one or more power amplifiers, and each power amplifier may be coupled with one or more antenna elements. In some examples, the phase shifters and/or weighting amplifiers may be located at the ground station 130. Communications for different user terminals 150 may be provided to a set of phase shifters that generates a set of phase-shifted signals and provides the set of phase-shifted signals to a set of amplifiers. The set of amplifiers may amplify the phase-shifted signals (e.g., with different degrees of amplitude) to obtain weighed signals and provide the weighted signals to a set of antenna elements. When emitted by the set of antenna elements, the weighted signals may constructively and/or destructively combine so that the weighted signals form a single signal that is focused on a geographic region of a larger geographic area serviced by the satellite 120. A transponder that is coupled with multiple antenna feed elements may be capable of performing beamformed communications.

A ground station 130 may perform phase calibration with tracking system 134 of the ground station transceiver 135. Tracking system 134 may include or be in communication with an antenna control unit to control ground station antenna system 131. The ground station antenna system 131 may also be referred to as an antenna or antenna assembly in some examples. As further described herein, ground station 130 may transmit forward uplink signals 132 to satellite 120 via control ground station antenna system 131, and receive return downlink signals 133 from satellite 120 via control ground station antenna system 131. In some examples, such communications may be in one or more of the S-band, X-band, Ku-band, Ka-band, Q-band, V-band, or in other similar signal bands in other examples (e.g., J-band, K-band, L-band, or some combination of these). The tracking system 134 may track a satellite 120 in order for the ground station 130 to communicate with the satellite 120.

The tracking system 134 may require calibration of phase differences in the signal paths of the sum and difference signals through the ground station antenna system 131 and the tracking receiver of the tracking system 134. Initial phase calibration may be performed in connection with the installation and setup of the tracking system 134. Additionally, during operation, phase calibration may be performed to compensate for phase offset changes due to changes in temperature at the ground station 130, and components thereof. Additionally certain components of the ground station 130 (e.g., of ground station antenna system 131, the ground station transceiver, including within the tracking system 134, etc.), may experience phase shift over time. In particular, amplifiers (e.g., low-noise block downconverter (LNBs)) of the tracking system 134 may experience phase offset instability with temperature, but also over time with a constant temperature.

As discussed further herein, the tracking system 134, and one or more components thereof, may perform an initial phase calibration that may include a characterization procedure. The characterization procedure may include a calibration output being generated by a tracking receiver (not shown) in the tracking system 134 for each frequency of a set of frequencies. The calibration signals are coupled back into a first input of the tracking receiver for a first path from the antenna, and coupled back into a second input of the tracking receiver for a second from the tracking feed. A phase value at each frequency of the set of frequencies may be determined for a particular receiver of the tracking system to generate a first set of phase values corresponding to the set of frequencies. In some examples, calibration factors associated with the particular receiver may then be stored. For example, a line may be fit to the set of phase values versus frequency, and determined the slope and offset of the fit line stored. Alternatively, the phase values themselves may be stored. This characterization procedure may also be performed for each other receiver of the tracking system 134. In some examples, a difference of phase values between different receivers at each frequency may be stored.

Thereafter, during operation, ground station 130 may receive communication signals on a first frequency (which may also be referred to as a carrier frequency), for example return downlink signals 133 from satellite 120 at ground station antenna system 131. The communication signals may follow a first path to a first input of a tracking receiver of the tracking system 134 via a first path, and may follow a second path (e.g., a tracking path) to a second input of the tracking receiver via a second path.

During the same time that the communication signal is being received at the tracking receiver (e.g., over a time period without interrupting the receipt of the communication signal), the tracking receiver may output a calibration signal that is coupled to the first path to be received at the first input, and coupled to the second path to be received at the second input. The calibration signal may be output by the tracking receiver a second frequency different than the first frequency of the received communication signals. In some examples, the calibration signal may be one of the set of frequencies used during the characterization procedure described herein. In other examples, the calibration signal may be a frequency within the range of the set of frequencies, but not one of the frequencies used during the characterization procedure.

The tracking system 134 (e.g., at the tracking receiver) may determine a phase value for the second frequency based on the calibration signal received at the first input and the calibration signal received at the second input. Using the stored calibration factors (e.g., a phase offset between the first frequency and the second frequency), the tracking receiver may determine (e.g., extrapolate, calculate, etc.) a second phase value that is associated with the first frequency for the communication signal from the phase value for the second frequency. In some examples, the tracking system 134 may also determine a second phase offset from the stored calibration factors. The second phase offset may be between a first receiver and a second receiver of the tracking receiver. The first receiver may be used for the first frequency for the communications signals and the second receiver for the second frequency for the calibration signal. The second phase offset may also be used to determine the second phase value that is associated with the first frequency, thereby taking into account differences in phase between different frequencies and receivers. The tracking system 134 may then generate a phase correction value for signals received at the first frequency. The phase correction value may then be used for the tracking procedure.

Table 1 below illustrates exemplary characterization data, from which the receiver calibration factors may be determined, then used.

TABLE 1

Exemplary Characterization Data for a Tracking System

| Frequency (MHz) | Receiver 1 Phase (degrees) | Receiver 2 Phase (degrees) | Receiver 1 Phase- Receiver 2 Phase (degrees) |
|---|---|---|---|
| 7750 | −15.1 | −89. | 73.9 |
| 7800 | −82.2 | −171.9 | 89.7 |
| 7850 | −163.3 | 115.8 | 81.0 |
| 7900 | 118.7 | 30.6 | 88.1 |
| 7950 | 10.9 | −57.8 | 98.7 |
| 8000 | −46.5 | −141.2 | 94.6 |
| 8050 | −127.5 | 129.1 | 103.3 |
| 8100 | 160.8 | 51.2 | 109.6 |
| 8150 | 78.4 | −37.5 | 115.9 |
| 8200 | 3.1 | −120.1 | 123.2 |
| 8250 | −70.5 | 163.9 | 125.6 |

In one example, the tracking receiver (e.g., a calibration component of the tracking receiver) may determine a slope (in) and offset (b) for a best fit line for each receiver of a tracking receiver based on the characterization data. A slope and offset may also be determined for the differences in phase between the first receiver and second receiver in some examples. The receiver calibration factors may then be indications of these slopes and offsets associated with each receiver.

During calibration, the tracking receiver may use the phase calibration data to determine the phase associated with a communications signal at a first frequency from a calibrations signal at a second frequency, without interrupting the communications signal. For example, according to the characterization data illustrate in Table 1, the communication signal may be at 8200 MHUz (and received at a first receiver of the tracking receiver) and the calibration signal may be at a frequency of 7750 MHz (and received at a second receiver of the tracking receiver). The tracking receiver may determine that the phase at the second receiver for the calibrations signal is −89 degrees. The tracking receiver (e.g., a calibration component of the tracking receiver) may then add the phase offset (the difference in phase between the first receiver and the second receiver) at 8200 MHz of 123.2 degrees (as indicated by the receiver calibration factors) to arrive at 34.2 degrees. The tracking receiver (e.g., a calibration component of the tracking receiver) may then add the phase offset at the second receiver (the difference in phase between 8200 MHz and 7750 MHz for the second receiver) of −120.1 degrees minus −89.0 degrees (as indicated by the receiver calibration factors), which is −31 degrees, to then arrive at 3.2 degrees. In this example, 3.2 degrees then represents the phase for the communication signal at the first frequency (8200 MHz), which can be used to generate a phase correction value for the communication signals without interrupting reception of the communication signal.

Figure 2:
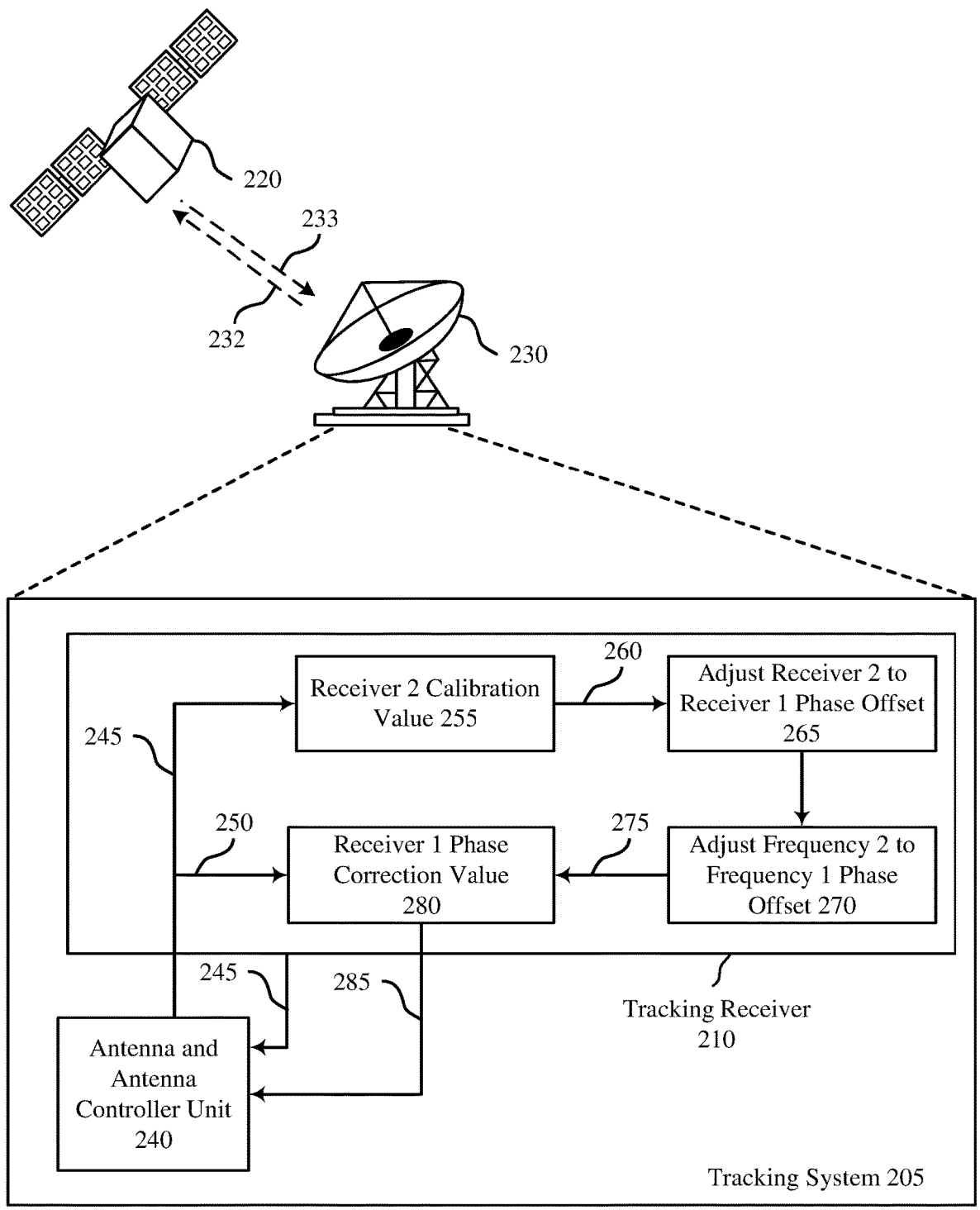
FIG. 2 illustrates another example of a satellite communications system that supports systems and method for calibrating ground stations in accordance with aspects described herein.

FIG. 2 shows an example of a satellite communications system 200 that supports systems and method for calibrating ground stations in accordance with aspects described herein. Satellite communications system 200 illustrate, in block diagram form, a satellite 220 and ground station 230. In some examples, satellite communications system 200 may be implemented by one or more aspects of satellite communications system 100. For example satellite 220 and ground station 230 may be examples of and perform one or more functions of satellite 120 and ground stations 130, respectively, as illustrated and described with reference to FIG. 1. Although one satellite 220 is shown, satellite 220 may represent one or more satellite or satellite networks in accordance with other examples. Satellite 220 may transmit downlink signals 233 to ground station 230, and satellite 220 may receive uplink signal 232 from ground station 230.

Ground station 230 may include a tracking system 205 (e.g., as part of a ground station transceiver) that may include one or more components shared with other functional blocks of the ground station 230. For example, the tracking system 205 may include an antenna and antenna controller unit 240, though the antenna controller unit may be considered part of other functional blocks of the ground station 230 as well. In other examples, the tracking system 205 may be in communication with the antenna controller unit 240, but be considered separate and/or distinct from the antenna controller unit 240.

The tracking system 205 may include a tracking receiver 210 coupled with the antenna controller unit. Details of aspects of tracking receiver 210 are further described herein, for example with reference to FIG. 4A. Tracking receiver 210 may also include a calibration component, which may implement 255, 265, 270, and 280, the functions of which are further described.

During operation, ground station 230 may receive communication signals on a first frequency (which may also be referred to as a carrier frequency) of a channel, for example return downlink signals 233 from satellite 220 at the ground station 230. The antenna and antenna controller unit 240 may provide a path 250 for the communication signals to an input of the tracking receiver 210. Tracking receiver 210 may also output a calibration signal on path 245 that may be coupled with one or more components of the antenna and antenna controller unit 240, including path 250 to a first input of the tracking receiver 210. The calibration signal may be at a second frequency different than the first frequency. In some example, the second frequency may be on a same channel (e.g., in the same RF spectrum band) as the first frequency. For example, ground station 230 may be configured to be able to receive at different frequencies across an RF spectrum band, for example a range of frequencies in the X-band (e.g., from about 7750 MHz to about 8250 MHz). In other examples, other frequencies may be used, including in other RF spectrum bands (e.g., Ka-band, Ku-band, C-band, etc.), or across two or more RF spectrum bands.

Tracking receiver 210 may include multiple receivers, including at least a first receiver for the communication signals on path 250 and a second receiver for the calibration signals on path 245. As further described herein, the calibration signals may be received at tracking receiver 210 concurrently with (e.g., in parallel with, contemporaneously to, etc.) the communication signals received from satellite 220. That is, ground station 230 may communicate without interruption while performing calibration. The communication signals may be received at the first receiver and the calibration signals may be received at the second receiver. Tracking receiver 210 may, at 255, determine a calibration value associated with the second receiver at the second frequency. This calibration value may represent a first phase value 260 for the second frequency. The tracking receiver may then adjust, at 265, the first phase value associated with the second receiver at the second frequency to a phase value associated with the first receiver and the second frequency according to a phase offset identified from the receiver calibration factors (e.g., the phase offset providing a mapping between phase associated with the first receiver and phase associated with the second receiver). The phase value associated with the second frequency may then be further adjusted at 270 to a second phase value 275 associated with the first frequency according to a phase offset identified from the receiver calibration factors (e.g., the phase offset providing a mapping between phase associated with the first frequency and phase associated with the second frequency, for example for the first receiver). From the second phase value, now adjusted from the second frequency for the calibration signal to the first frequency for the communications signal, at 280 a phase correction value for the first receiver may be generated to use for phase calibration.

Figure 3:
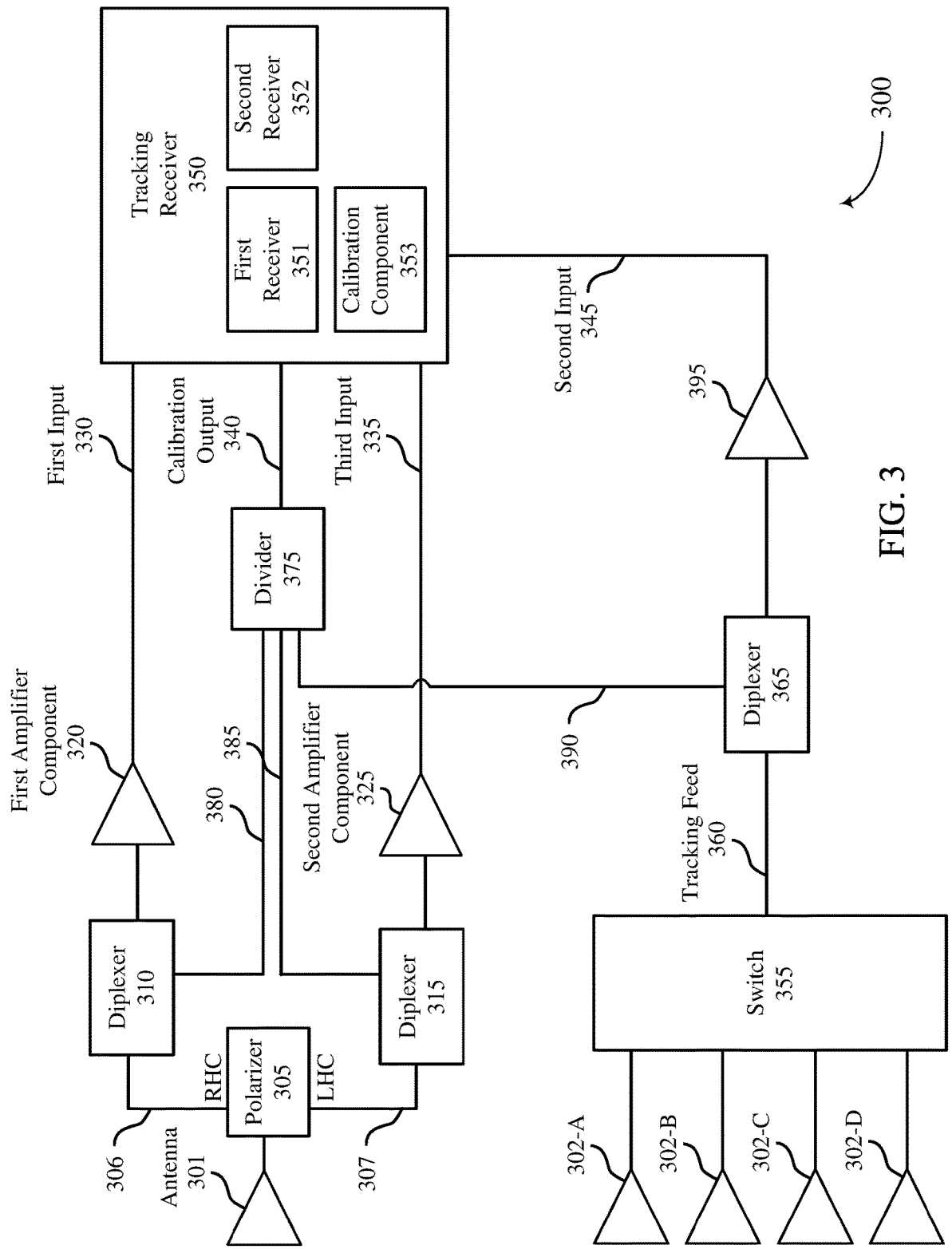
FIGS. 3 and 4 illustrate examples of tracking systems that support systems and method for calibrating ground stations in accordance with aspects described herein.

FIG. 3 illustrates an example of a tracking system 300 that supports systems and method for calibrating ground stations in accordance with aspects described herein. In some examples, tracking system 300 may be implemented by one or more aspects of satellite communications system 100 and/or satellite communications system 200. For instance, tracking receiver 350 may be an example of a tracking receiver 210 as described with reference to FIG. 1 and/or a tracking receiver 210 as described with reference to FIG. 2; tracking system 300 may be an example of a tracking system 134 as described with reference to FIG. 1 and/or a tracking system 205 as described with reference to FIG. 2.

Tracking system 300 may include or be coupled with an antenna 301 to receive downlink signals. The antenna 301 may be coupled with a polarizer 305 that directs the received signal to a diplexer 310 along path 306 for a first type of polarization (e.g., right-hand circular (RHC) polarization). Path 306 may form a portion of a first path from antenna 301 to the tracking receiver 350. Path 380 may be coupled at diplexer 310 which is coupled with a first amplifier component 320. First amplifier component 320 is coupled to a first input 330 of tracking receiver 350.

Polarizer 305 may also direct the received signal to a diplexer 315 along path 307 for a second type of polarization (e.g., left-hand circular (LHC) polarization). Path 307 may form a portion of a third path from antenna 301 to the tracking receiver 350. The received signal may be coupled with signals from path 385 at diplexer 315 which is coupled with a second amplifier component 325. Second amplifier component 325 is coupled to a third input 335 of tracking receiver 350.

Tracking receiver 350 may also be coupled with a tracking feed 360. In some examples, the tracking feed may couple a set of antennas including antenna 302, antenna 302-*b*, antenna 302-*c*, and antenna 302-*d* to diplexer 365 via a switch 355 that is in turn coupled to an amplifier component 395. Amplifier component 395 may be coupled to a second input 345 of tracking receiver 350. Switch 355 may select which of antenna 302, antenna 302-*b*, antenna 302-*c*, or antenna 302-*d* to couple to the tracking receiver 350 for the tracking feed 360, for example while performing tracking of a satellite with which a ground station is communicating.

Tracking receiver 350 may provide a calibration output 340 that is coupled with a divider 375. Divider 375 may be coupled with diplexer 310 via path 380, coupled with diplexer 315 via path 385, and coupled with diplexer 365 via path 390. Calibration signals output by tracking receiver 350 may thus be output by tracking receiver 350 and received back at tracking receiver 350 at first input 330, second input 345, and third input 335.

Tracking receiver 350 may include multiple receivers, including first receiver 351, second receiver 352, third receiver 354, and a calibration component 353.

First receiver 351 may be coupled with first input 330 and second input 345, and output a value to calibration component 353. First receiver 351 may be configurable to be tuned to receive (or tracking receiver 350 may be tuned to provide to first receiver 351) signals of a first frequency. Calibration component 353 may then determine a phase value (e.g., a phase offset, phase difference) between a communication signal received at the first frequency via antenna 301 and the first path to tracking receiver 350 at first input 330, and the signals communication signal received at the first frequency via antenna 301 and the first path to tracking receiver 350 at first input 330.

Second receiver 352 may be coupled with first input 330 and second input 345, and output a value to calibration component 353. Second receiver 352 may be tuned to receive (or tracking receiver 350 may be tuned to provide to second receiver 352) signals of a second frequency. Calibration component 353 may then determine a phase value (e.g., a phase offset, phase difference) between a calibration signal output by tracking receiver 350 via calibration output 340 and received at the second frequency via the path 380 to the first path to tracking receiver 350 at first input 330, and the calibration signal output by tracking receiver 350 via calibration output 340 and received at the second frequency via the path 390 to the second path to tracking receiver 350 at second input 345.

Calibration component 353 may use the phase value for the first frequency associated with the communication signal and the phase value for the second frequency associated with the calibration signal, together with a set of calibration factors, to determine a phase correction value for the communication signals for the first frequency. In some examples, calibration component 353 may perform features of the tracking receiver 210 described with reference to FIG. 2, in particular features at 255, 265, 270, and 280.

In some examples, one or more of first amplifier component 320, second amplifier component 325, or amplifier component 395 may be or include LNBs. An LNB may be a device that is used to down convert a frequency and amplify the signal for further processing. In some examples, the LNB may be or include a low noise amplifier (LNA), down converting mixer, local oscillator and an intermediate-frequency amplifier. The LNB may amplify signals received from the satellite and down convert the higher frequency signals to lower intermediate frequency (IF) signals. In some examples, the use of LNBs together with the techniques described herein may eliminate the need for phase matched LNAs, and allowing the use of lower cost LNBs.

Figure 4:
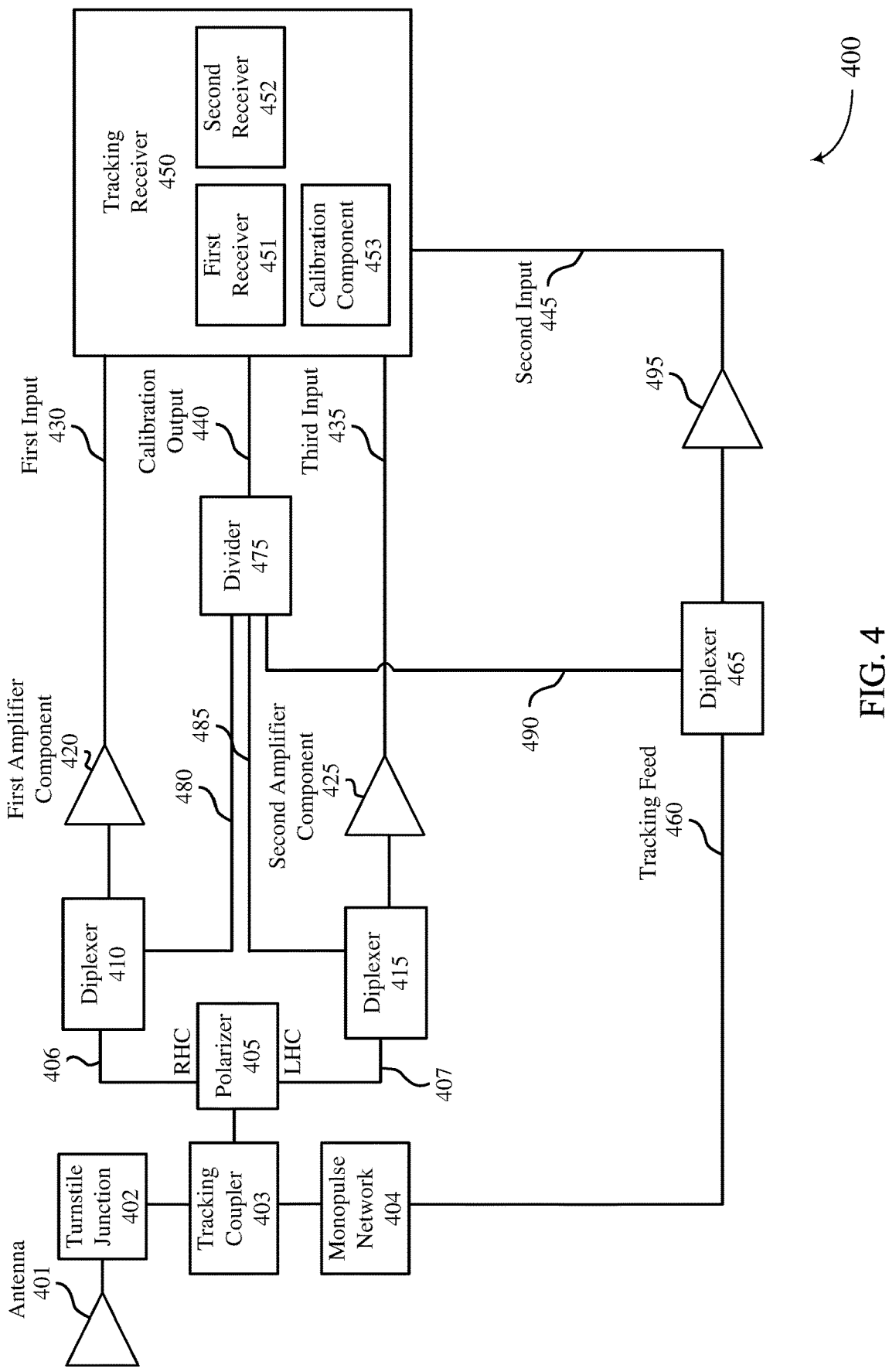

FIG. 4 illustrates an example of a tracking system 400 that supports systems and method for calibrating ground stations in accordance with aspects described herein. In some examples, tracking system 400 may be implemented by one or more aspects of satellite communications system 100 and/or satellite communications system 200. For instance, tracking receiver 450 may be an example of a tracking receiver 210 as described with reference to FIG. 1 and/or a tracking receiver 210 as described with reference to FIG. 2 and/or a tracking receiver 350 as described with reference to FIG. 3; tracking system 400 may be an example of a tracking system 134 as described with reference to FIG. 1 and/or a tracking system 205 as described with reference to FIG. 2 and/or a tracking system 300 as described with reference to FIG. 3.

Tracking system 400 may include or be coupled with an antenna 401 to receive downlink signals. The antenna 401 may be coupled with a turnstile junction 402, which in turn may be coupled with a tracking coupler 403. The tracking coupler 403 may be coupled with a polarizer 405 and a monopulse network 404. The polarizer 405 may direct the received signal to a diplexer 410 along path 406 for a first type of polarization (e.g., right-hand circular (RHC) polarization). Path 406 may form a portion of a first path from antenna 401 to the tracking receiver 450. Path 480 may be coupled at diplexer 410 which is coupled with a first amplifier component 420. First amplifier component 420 is coupled to a first input 430 of tracking receiver 450.

Polarizer 405 may also direct the received signal to a diplexer 415 along path 407 for a second type of polarization (e.g., left-hand circular (LHC) polarization). Path 407 may form a portion of a third path from antenna 401 to the tracking receiver 450. The received signal may be coupled with signals from path 485 at diplexer 415 which is coupled with a second amplifier component 425. Second amplifier component 425 is coupled to a third input 435 of tracking receiver 450.

Tracking receiver 450 may also be coupled with a tracking feed 460. In some examples, the tracking feed may couple the antenna 401 to diplexer 465 via tracking coupler 403. Diplexer 465 may be in turn coupled to an amplifier component 495. Amplifier component 495 may be coupled to a second input 445 of tracking receiver 450. Tracking coupler 403 may be used provide a signal (e.g., a tracking signal) at the first frequency for the communication signal while performing tracking of a satellite with which a ground station is communicating. In some examples, the tracking coupler 403 may be a TE21 coupler. For a TE21 coupler, the phase states are 0, 90, 180, 270. There may be no switching as the Azimuth/Elevation separation is done by TE21 quadrature orthogonality between Azimuth/Elevation.

Tracking receiver 450 may provide a calibration output 440 that is coupled with a divider 475. Divider 475 may be coupled with diplexer 410 via path 480, coupled with diplexer 415 via path 485, and coupled with diplexer 465 via path 490. Calibration signals output by tracking receiver 450 may thus be output by tracking receiver 450 and received back at tracking receiver 450 at first input 430, second input 445, and third input 435.

Tracking receiver 450 may include multiple receivers, including first receiver 451, second receiver 452, third receiver 454, and a calibration component 453.

First receiver 451 may be coupled with first input 430 and second input 445, and output a value to calibration component 453. First receiver 451 may be configurable to be tuned to receive (or tracking receiver 450 may be tuned to provide to first receiver 451) signals of a first frequency. Calibration 302-a component 453 may then determine a phase value (e.g., a phase offset, phase difference) between a communication signal received at the first frequency via antenna 401 and the first path to tracking receiver 450 at first input 430, and the signals communication signal received at the first frequency via antenna 401 and the first path to tracking receiver 450 at first input 430.

Second receiver 452 may be coupled with first input 430 and second input 445, and output a value to calibration component 453. Second receiver 452 may be tuned to receive (or tracking receiver 450 may be tuned to provide to second receiver 452) signals of a second frequency. Calibration component 453 may then determine a phase value (e.g., a phase offset, phase difference) between a calibration signal output by tracking receiver 450 via calibration output 440 and received at the second frequency via the path 480 to the first path to tracking receiver 450 at first input 430, and the calibration signal output by tracking receiver 450 via calibration output 440 and received at the second frequency via the path 490 to the second path to tracking receiver 450 at second input 445.

Calibration component 453 may use the phase value for the first frequency associated with the communication signal and the phase value for the second frequency associated with the calibration signal, together with a set of calibration factors, to determine a phase correction value for the communication signals for the first frequency. In some examples, calibration component 453 may perform features of the tracking receiver 210 described with reference to FIG. 2, in particular features at 255, 265, 270, and 280.

In some examples, one or more of first amplifier component 420, second amplifier component 425, or amplifier component 495 may be or include LNBs. An LNB may be a device that is used to down convert a frequency and amplify the signal for further processing. In some examples, the LNB may be or include a LNA, down converting mixer, local oscillator and an intermediate-frequency amplifier. The LNB may amplify signals received from the satellite and down convert the higher frequency signals to lower intermediate frequency (IF) signals. In some examples, the use of LNBs together with the techniques described herein may eliminate the need for phase matched LNAs, and allowing the use of lower cost LNBs.

Figure 5A:
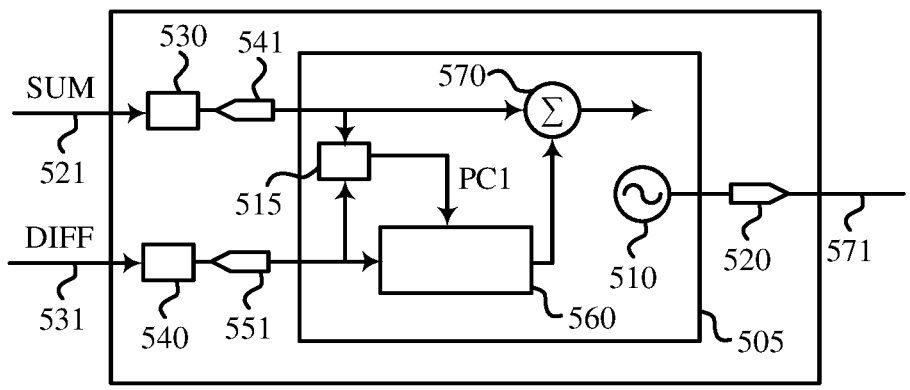
FIG. 5A illustrates an example of a tracking receiver that supports systems and method for calibrating ground stations in accordance with aspects described herein.

FIG. 5A illustrates an example of a tracking receiver 500-a that supports systems and method for calibrating ground stations in accordance with aspects described herein. In some examples, tracking receiver 500-a may be an example of portions or aspects of tracking receiver 350 or tracking receiver 450.

As an example, the tracking receiver 500-a may include a sum input 521 (SUM) (which may be an example of a first input 330 or 430), a difference input 531 (DIFF) (which may be an example of a second input 345 or 445), a first analog-to-digital (A/D) converter 541, a second A/D converter 551, a digital signal processor (DSP) 505, and calibration output 571. The first A/D converter 541 may be coupled between the sum input 521 and the DSP 505. The first A/D converter 541 may be configured to convert a signal received at the sum input 521 into a sum digital signal, and to provide the sum digital signal to the DSP 505. The second A/D converter 551 may be coupled between the difference input 531 and the DSP 505. The second A/D converter 551 may be configured to convert a signal received at the difference input 531 into a difference digital signal, and to provide the difference digital signal to the DSP 505. The calibration output 571 may be coupled to the sum input 521 (e.g., via the first path as further described herein) and coupled to the difference input 531 (e.g., via the second path as further described herein). The tracking receiver 500-a may be configured to generate a calibration signal and provide the calibration signal through the calibration output 571.

In more detailed aspects of the disclosure, the DSP 505 may be configured to generate a phase correction value PC1 based on the sum digital signal and the difference digital signal resulting from the calibration signal coupled to the sum input 521 and coupled to the difference input 531. The DSP 505 may be further configured to store the phase correction value. The phase correction value may correspond to a phase difference between the sum digital signal and the difference digital signal. A first calibration signal insertion component (not shown) may be coupled between the calibration output 571 and the sum input 521, and may define a first signal path between the sum input 521 and the first calibration signal insertion component. A second calibration signal insertion component (not shown) may be coupled between the calibration output 571 and the difference input 531, and may define a second signal path between the difference input 531 and the second calibration signal insertion component. The first signal path and the second signal path may have different phase shifts due to one or more components along the respective signal paths. The DSP 505 may be configured to generate a phase correction value (e.g., PC1) based on a phase difference between the first signal path and the second signal path in response to the calibration signal.

A calibration signal may be generated by DSP 505 using a configurable direct digital synthesizer (DDS) 510. The DDS 510 outputs a digital calibration signal to a digital-to-analog converter (DAC) 520. The DAC 520 outputs the calibration signal, at the calibration output 571, based on the digital calibration signal. This calibration signal may also be generated with a phase-locked-loop (PLL) and a voltage-controlled oscillator (VCO) (not shown). Two voltage controlled amplifiers, 530 and 540, may set the level of the signal input into the A/D converters, 541 and 551, respectively. A differential phase detector 515 detects the phase difference (or phase offset) between the digital sum signal and the digital difference signal output by the A/D converters, 541 and 551, respectively, The differential phase detector 515 generates the phase correction value based on the detected phase difference and provides the phase correction value to a phase adjustment rotator 560. In the illustrated example, the phase adjustment rotator 560 digitally adjusts the phase of the digital difference signal in this example. More generally, the phase of the digital sum signal and/or the phase of the digital different signal may be adjusted using the phase correction value in order to phase match (or phase align) the two signals. The adjusted digital difference signal is combined with the digital sum signal by a combination/sum operation 570.

In a more detailed aspect of the disclosure, the differential phase detector 515 may use a complex conjugate multiply, and a complex integrate and dump. An instantaneous estimate of the phase offset may be calculated using the complex conjugate multiply. The sum signal may be modeled by $e^{(j\omega t+\theta 1)}$ and the difference signal may be modeled by $e^{(j\omega t+\theta 2)}$. A complex conjugate multiply may produce the following:

$$CC_{instant}=e^{(j\omega t+\theta 1)}*e^{-1*(j\omega t+\theta 2)}=e^{(j\omega t+\theta 1-j\omega t-\theta 2)}=$$
$$e^{(\theta 1-\theta 2)}=\cos(\theta 1-\theta 2)-j\sin(\theta 1-\theta 2)$$

This instantaneous phase estimate may be averaged using a complex integrate and dump. The values may be accumulated over $2^N$ samples, and the accumulated result may be divided by $2^N$:

$$CC_{ave}=(\frac{1}{2}^N)\Sigma[\cos(\theta 1-\theta 2)-j\sin(\theta 1-\theta 2)]$$

The averaged complex result may be input into an arctan function to recover the phase offset value:

$$\Theta_{ave}=\arctan[\text{Im}(CC_{ave})/\text{Re}(CC_{ave})]\approx-(\theta 1-\theta 2)$$

The phase adjustment rotator 560 may phase rotate the digital difference signal to remove the phase offset between the sum and difference signals. The phase adjustment rotator 560 receives the difference digital signal and the resulting phase offset value, and outputs a phase rotated complex value.

In some examples, the phase calibration may be performed at multiple frequencies within the operating bandwidth of the tracking system by generating continuous wave (CW) tones at each step, and performing the phase error calibration at each of the steps. The steps may for example be selected to correspond to a predetermined maximum value (e.g., about 20 degrees of phase difference in a worst case scenario) of phase mismatch. Thus, the steps may be selected to allow for easy interpolation between steps.

The tracking receiver of the tracking system 134, integrated with the tracking feed, may perform the phase matching of the RF signal paths in the digital domain of the DSP 505 using injection of the calibration signal into the signal paths. The tracking receiver of the tracking system 134 may send and receive the calibration signals to perform the phase calibration. During the tracking mode, the tracking receiver of the tracking system 134 also may output a tracking error signal to an ACU (not shown), for examples antenna and antenna controller unit 240 of FIG. 2, via digital signals (e.g. Ethernet messages) rather than via an analog signal over expensive rf cables.

These aspects may allow for reduced cost in the components of the system. Phase matched LNAs may no longer be required, thus allowing the use of lower cost LNBs. Azimuth/Elevation switch control and ACU functionality may be moved into the tracking receiver of the tracking system 134 thus requiring less cabling between the ACU and the tracking receiver of the tracking system 134. ACU functionality also may be moved to the tracking receiver, e.g., bin integration. Using the calibration to align and combine the sum and difference signals in the DSP 505 of the tracking receiver of the tracking system 134 may provide multiple benefits. As examples, it may eliminate an external phaseshifter and coupler by creating a phaseshifter and coupler in the DSP 505. Further, it may reduce labor cost in construction of the tracking system 134. Delay and phase may be characterized, but matching may not be required between the sum and difference channels. It is much easier to characterize or measure phase than it is to physically cut cables to match phase.

Figure 5B:
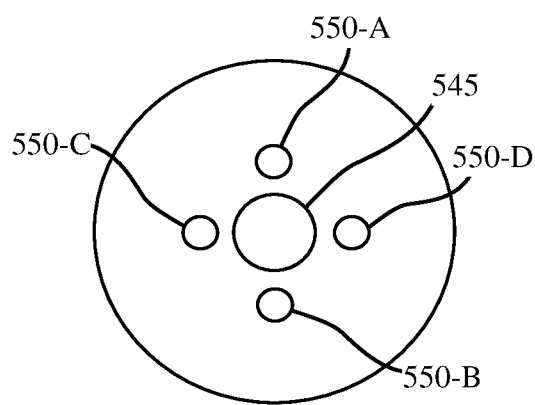
FIGS. 5B and 5C illustrate examples antenna systems that support systems and method for calibrating ground stations in accordance with aspects described herein.

FIG. 5B illustrates an example of an antenna system 500-b that supports systems and method for calibrating ground stations in accordance with aspects described herein. In some examples, antenna system 500-b may be an example of portions of ground station antenna system 131. The antenna 545 may be or include a central feed horn, and four surrounding offset antennas 550-N that may be smaller feed horns. In some examples, antenna 545 may be an example of antenna 301 and/or antenna 401.

Two of the offset antennas, 550-a and 550-b, may be used for elevation tracking and may be positioned above and below the antenna system 500-b. Two of the offset antennas, 550-c and 550-d, may be used for horizontal (azimuth) tracking, and may be positioned to the right and the left the antenna system 500-b.

The antenna system 500-b may be aligned to the antenna boresite while the offset antennas 550-N may be offset from boresite by a slight angle. The antenna system 500-b may be used for acquiring data from a satellite (or other signal source) since it has the greatest sensitivity. The sum signal from the antenna system 500-b may be used to normalize the difference signals from the offset antennas 550-N in order to keep a constant error slope when a range to the satellite is varying. The variation in signal due to range is common to all antennas so normalizing the difference signals to the sum signal keeps the difference path error slope constant. The signals from offset antennas 550-N are used to generate the tracking signals.

Figure 5C:
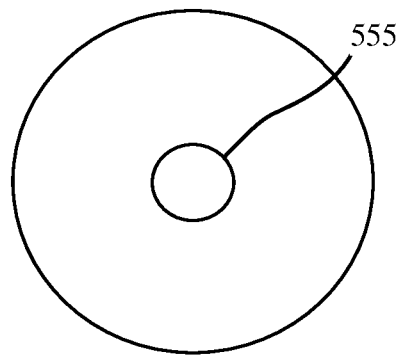

FIG. 5C illustrates an example of an antenna system 500-c that supports systems and method for calibrating ground stations in accordance with aspects described herein. In some examples, antenna system 500-c may be an example of portions of ground station antenna system 131. The antenna 555 may be or include a central feed horn (e.g., lacking surrounding offset antennas). In some examples, antenna 555 may be an example of antenna 301 and/or antenna 401. Antenna 555 may be coupled to a tracking coupler, such as tracking coupler 403 for vertical (elevation) tracking and horizontal (azimuth) tracking.

The characterization of the phase shifts (or phase offset or delay) associated with each frequency of a set of frequencies for the signal paths through the antenna system 500-c may be done one time, for example during or soon after installation, as further described herein. In one example, the characterization may be made at room temperature. In other examples, different ambient temperatures may be used.

Figure 6:
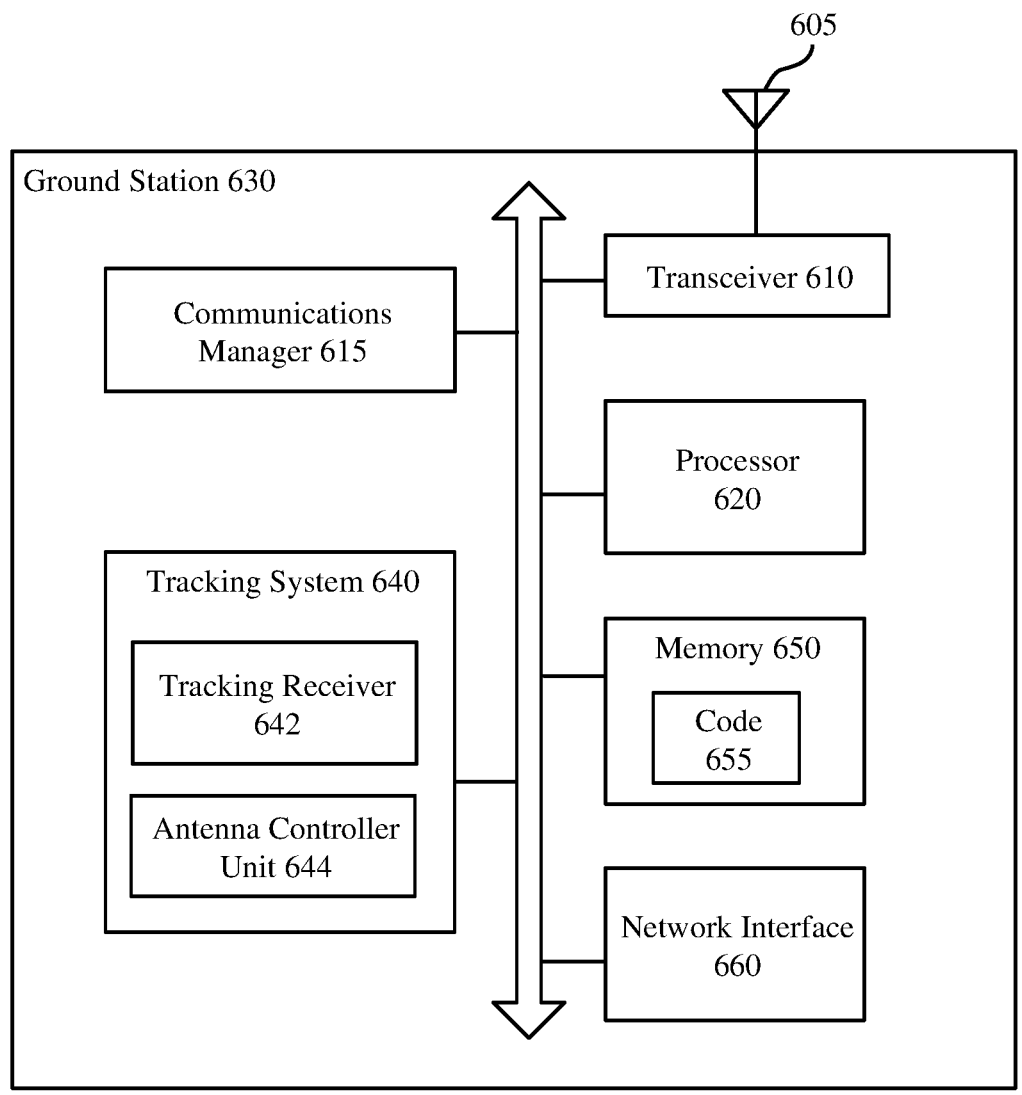
FIG. 6 illustrates an example of a ground station that supports systems and method for calibrating ground stations in accordance with aspects described herein.

FIG. 6 illustrates an example of a ground station 630 that supports systems and methods for calibrating ground stations in accordance with aspects described herein. Ground station 630 may be an example of or include the components of a ground station 130 or 230 as described with reference to FIGS. 1 and 2. Ground station 630 may include component for bi-directional communications, including components for transmitting and receiving components and for processing data received in communications. Ground station 630 may include antenna 605, transceiver 610, communications manager 615, processor 620, tracking system 640, memory 650, and network interface 660.

Antenna 605 may be configured to receive or transmit information from or to satellites using RF signals. Antenna 605 may be or include a parabolic antenna. In some examples, antenna 605 may be an example of antenna system 500-b or 500-c, described with reference to FIGS. 5B and 5C. To receive signals, antenna 605 may reflect received signals to a focal point where an antenna feed passes the signals to a receive chain. To transmit signals, antenna 605 may reflect signals originating from the antenna feed at the focal point.

Transceiver 610 may communicate bi-directionally with another wireless transceiver. The transceiver 610 may also include a modem to modulate signals and provide the modulated signals to antenna 605. The modem may also demodulate signals received from antenna 605. The transceiver 610 and antenna 605 may be an example of a receiver, a transmitter, or both.

Processor 620 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 620 may be configured to operate a memory array using a memory controller. In some other cases, a memory controller may be integrated into the processor 620. The processor 620 may be configured to execute computer-readable instructions stored in a memory (e.g., memory 650) to cause the ground station 630 to perform various functions (e.g., functions or tasks supporting communication for collision detection/warning). For example, the ground station 630 or a component of the ground station 630 may include a processor 620 and memory 650 coupled to the processor 620 that are configured to perform various functions described herein.

The memory 650 may include random access memory (RAM) and read-only memory (ROM). The memory 650 may store code that is computer-readable and computer-executable. The code may include instructions that, when executed by the processor 620, cause the ground station 630 to perform various functions described herein. The code 655 may be stored in a non-transitory computer-readable medium such as system memory or another type of memory. In some cases, the code 655 may not be directly executable by the processor 620 but may cause a computer (e.g., when compiled and executed) to perform functions described herein. In some cases, the memory 650 may contain, among other things, a basic I/O system (BIOS) which may control basic hardware or software operation such as the interaction with peripheral components or devices.

Communications manager 615 may support satellite communications. In some examples, communications manager 615 is used to form beams that span a coverage area. Communications manager 615 may also be used to handle mobility events, such as handing over a user terminal between satellite beams, satellites or handing over non-GEO satellites between GEO satellites. Communications manager 615 may also be used to schedule communications resources for different devices, generate data messages in accordance with a satellite protocol, and map symbols to communication resources.

In some examples, the communications manager 615 may be configured to perform various operations (e.g., receiving, monitoring, transmitting) using or otherwise in cooperation with transceiver 610, antenna 605, or any combination thereof. Although the communications manager 615 is illustrated as a separate component, in some examples, one or more functions described with reference to the communications manager 615 may be supported by or performed by processor 620, memory 650, code 655, or any combination thereof. For example, code 655 may include instructions executable by the processor 620 to cause the ground station 630 to perform various aspects of lens communication with multiple antenna arrays as described herein, or processor 620 and memory 650 may be otherwise configured to perform or support such operations.

Network interface 660 may be configured to send and receive information to other networks (e.g., the Internet, cellular networks, telephone networks, private networks, government networks, etc.). Network interface 660 may translate messages from one protocol to another protocol (e.g., a satellite-based protocol to an Internet protocol).

Tracking system 640 may be configured to support systems and methods for calibrating ground stations. In some examples, tracking system 640 may receive, at a first input of tracking receiver 642, a first signal at a first frequency via a first path and a calibration signal at a second frequency. Tracking system may also receive, at a second input of the tracking receiver 642, the first signal at the first frequency via a second path and the calibration signal at the second frequency. Tracking system 640 may additionally output the calibration signal to a first coupler coupled with the first path and a second coupler coupled with the second path. Tracking system 640 may then determine a first phase value for the second frequency based at least in part on the calibration signal received at the first input and the second input at the second frequency. Tracking system 640 may next determine, from the first phase value, a second phase value associated with the first frequency based at least in part on a first phase offset between the first frequency and the second frequency. The first phase offset may be determined based at least in part on a first set of receiver calibration factors. Based at least in part on the second phase value, tracking system 640 may thereafter generate a phase correction value for signals received at the first frequency via the antenna 605.

In some examples, the tracking receiver 642 may include multiple receivers that may be used to receive signals at different frequencies at the same time (e.g., concurrently). For example, the tracking receiver 642 may include a first receiver for the first signal at the first frequency and a second receiver for the calibration signal at the second frequency. Each receiver may affect the phase of received signals differently due to differences in temperature, structure, design, etc., of the receivers. As such, the second phase value associated with the first frequency may be determined based at least in part on a second phase offset between the first receiver for the first frequency and the second receiver for the first frequency. This second phase offset may be determined based at least in part on the first set of receiver calibration factors. In some examples, the second phase offset between the first receiver and the second receiver may be based on the receiver calibration factors determined during the characterization performed during or after installation of the ground station 630. In some examples, the second phase offset may be determined from the first setoff receiver calibration factors based at least in part on a slope and an offset, or a temperature, or a combination of these, stored as the receiver calibration factors.

Tracking system 640 may also perform calibration during certain time intervals (e.g., periodically, or according to a schedule). As such, the tracking system 640 may identify a time interval (e.g., a periodic time interval) for performing calibration, and generate an updated phase correction value for the first signal received via the antenna at the first frequency according to the periodic time interval.

In some examples, the tracking feed may be or be coupled with a set of antennas offset from the antenna configured to receive the first signal at the first frequency. The set of antennas may be coupled with the second input via the second path. In other examples, the antenna feed may include a tracking coupler coupled with the first path to receive the first signal at the first frequency. The tracking coupler may be coupled with the second input via the second path.

In some examples of tracking system 640, the ground station 630 may store multiple sets of receiver calibration factors. For example, a first set of receiver calibration factors may be associated with the first path (e.g., from antenna 605 to tracking receiver 642 at a first input), and a second set of receiver calibration factors may be associated with the second path (e.g., from antenna 605 to tracking receiver 642 at a third input). In some examples, the first path may be associated with a first type of polarization (e.g., left-hand circular polarization), and a first set of receiver calibration factors may be associated with the first path. The ground station 630 may also be configured to receive a second type of polarization (e.g., right-hand circular polarization). In such case, a second set of receiver calibration factors may be associated with the second path. In some examples the second set of receiver calibration factors may be associated with differences between the first path and the second path, or between the first receiver for the first path and a second receiver associated with the second path, or both. The tracking receiver 642 may include a third input coupled with the antenna 605 to receive the first signal via the second path.

According to some examples of tracking system 640, the tracking receiver 642 may output, from the calibration output, a calibration signal at each frequency of a set of frequencies. The tracking system 640 may then receive the output calibration signals at the first input and the second input, and determine a first set of phase values associated with a first receiver of the tracking receiver 642. In some examples, the first receiver is coupled to both the first input and the second input. Tracking receiver 642 may then determine a second set of phase values associated with a second receiver of the tracking receiver 642, the second also receiver coupled to both the first input and the second input. Tracking receiver may then generate the first set of receiver calibration factors based at least in part on the first set of phase values and the second set of phase values.

In some examples of the tracking system 640, generating the first set of receiver calibration factors based at least in part on the first set of phase values and the second set of phase values includes determining a first slope and a first offset for a first line fitting a difference between the first set of phase values and the second set of phase values as a function of frequency and determining a second slope and a second offset for a second line fitting the first set of phase values as a function of frequency. In some examples, the set of receiver calibration factors include at least the first slope, the first offset, the second slope, and the second offset.

In some examples, tracking system 640, tracking receiver 642, antenna controller unit 644, communications manager 615, transceiver 610, or various combinations or components thereof, may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, tracking system 640, tracking receiver 642, antenna controller unit 644, communications manager 615, transceiver 610, or various combinations or components thereof, may be implemented in code 655 (e.g., as communications management software or firmware), executed by processor 620. If implemented in code 655 executed by processor 620, the functions of tracking system 640, tracking receiver 642, antenna controller unit 644, communications manager 615, transceiver 610, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

Figure 7:
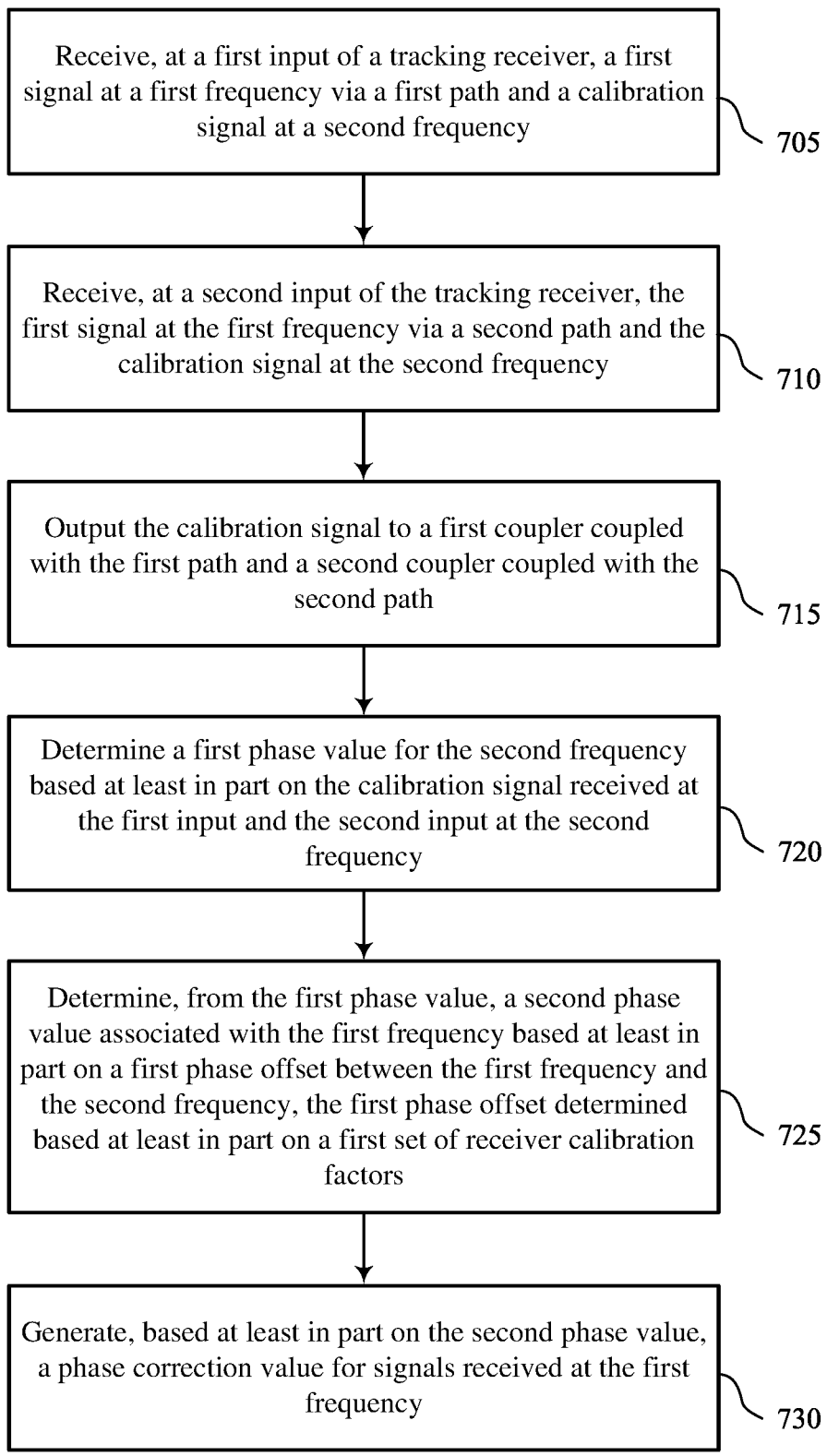
FIGS. 7 and 8 show flowcharts illustrating a method or methods that support systems and method for calibrating ground stations in accordance with aspects described herein.

FIG. 7 shows a flowchart illustrating a method 700 that supports systems and method for calibrating ground stations in accordance with examples as disclosed herein. The operations of method 700 may be implemented by a grounds, for example ground station 130, 230, 630 or its components, as described herein. For example, the operations of method 700 may be performed by ground station transceiver 135 (e.g., more specifically tracking system 134), tracking system 205 (e.g., more specifically tracking receiver 210), tracking receiver 350, or tracking receiver 450. In some examples, the ground station (e.g., more specifically the tracking system, or tracking receiver of the tracking system) may execute a set of instructions to control the functional elements of the device to perform the described functions. Additionally or alternatively, the ground station may perform aspects of the described functions using special-purpose hardware.

At 705, the method may include receiving, at a first input of a tracking receiver, a first signal at a first frequency via a first path and a calibration signal at a second frequency. The operations of 705 may be performed in accordance with examples as disclosed herein.

At 710, the method may include t receiving, at a second input of the tracking receiver, the first signal at the first frequency via a second path and the calibration signal at the second frequency. The operations of 710 may be performed in accordance with examples as disclosed herein.

At 715, the method may include outputting the calibration signal to a first coupler coupled with the first path and a second coupler coupled with the second path. The operations of 715 may be performed in accordance with examples as disclosed herein.

At 720, the method may include determining a first phase value for the second frequency based at least in part on the calibration signal received at the first input and the second input at the second frequency. The operations of 720 may be performed in accordance with examples as disclosed herein.

At 725, the method may include determining, from the first phase value, a second phase value associated with the first frequency based at least in part on a first phase offset between the first frequency and the second frequency, the first phase offset determined based at least in part on a first set of receiver calibration factors. The operations of 725 may be performed in accordance with examples as disclosed herein.

At 730, the method may include generating, based at least in part on the second phase value, a phase correction value for signals received at the first frequency, for example via the antenna. The operations of 730 may be performed in accordance with examples as disclosed herein.

Figure 8:
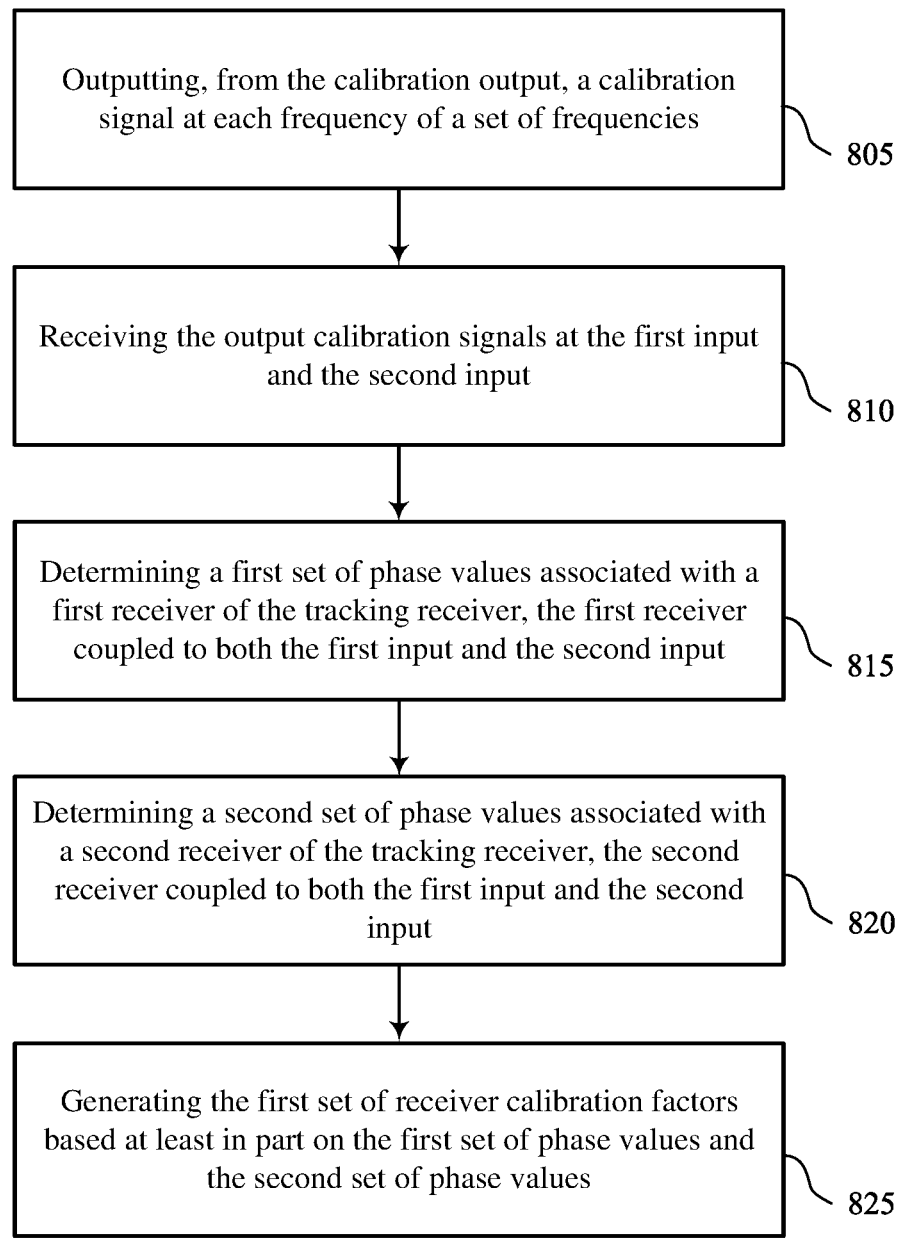

FIG. 8 shows a flowchart illustrating a method 800 that supports systems and method for calibrating ground stations in accordance with examples as disclosed herein. The operations of method 800 may be implemented by a grounds, for example ground station 130, 230, 630 or its components, as described herein. For example, the operations of method 800 may be performed by ground station transceiver 135 (e.g., more specifically tracking system 134), tracking system 205 (e.g., more specifically tracking receiver 210), tracking receiver 350, or tracking receiver 450. In some examples, the ground station (e.g., more specifically the tracking system, or tracking receiver of the tracking system) may execute a set of instructions to control the functional elements of the device to perform the described functions. Additionally or alternatively, the ground station may perform aspects of the described functions using special-purpose hardware.

At 805, the method may include outputting, from the calibration output, a calibration signal at each frequency of a set of frequencies. The operations of 805 may be performed in accordance with examples as disclosed herein.

At 810, the method may include receiving the output calibration signals at the first input and the second input. The operations of 810 may be performed in accordance with examples as disclosed herein.

At 815, the method may include determining a first set of phase values associated with a first receiver of the tracking receiver, the first receiver coupled to both the first input and the second input. The operations of 815 may be performed in accordance with examples as disclosed herein.

At 820, the method may include determining a second set of phase values associated with a second receiver of the tracking receiver, the second receiver coupled to both the first input and the second input. The operations of 820 may be performed in accordance with examples as disclosed herein.

At 825, the method may include generating the first set of receiver calibration factors based at least in part on the first set of phase values and the second set of phase values. The operations of 825 may be performed in accordance with examples as disclosed herein.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. In one example, method 800 may be performed (e.g., in a characterization phase) and method 900 may be later performed (e.g., in a calibration phase that uses the set of receiver calibration factors).

An apparatus is described. The following provides an overview of aspects of the apparatus as described herein:

The following provides an overview of aspects of the present disclosure:

Aspect 1: A method for use in a satellite communication system, comprising: receiving, at a first input of a tracking receiver, a first signal at a first frequency via a first path and a calibration signal at a second frequency; receiving, at a second input of the tracking receiver, the first signal at the first frequency via a second path and the calibration signal at the second frequency; outputting the calibration signal to a first coupler coupled with the first path and a second coupler coupled with the second path; determining a first phase value for the second frequency based at least in part on the calibration signal received at the first input and the second input at the second frequency; determining, from the first phase value, a second phase value associated with the first frequency based at least in part on a first phase offset between the first frequency and the second frequency, the first phase offset determined based at least in part on a first set of receiver calibration factors; and generating, based at least in part on the second phase value, a phase correction value for signals received at the first frequency.

Aspect 2: The method of aspect 1, wherein the tracking receiver comprises at least a first receiver for the first signal at the first frequency and a second receiver for the calibration signal at the second frequency; and the second phase value associated with the first frequency is determined based at least in part on a second phase offset between the first receiver for the first frequency and the second receiver for the first frequency, the second phase offset determined based at least in part on the first set of receiver calibration factors.

Aspect 3: The method of aspect 2, further comprising: determining the second phase offset from the first setoff receiver calibration factors based at least in part on a slope, an offset, and a temperature.

Aspect 4: The method of any of aspects 1 through 3, further comprising: selecting the second frequency for the calibration output based at least in part on the second frequency being different from the first frequency.

Aspect 5: The method of any of aspects 1 through 4, further comprising: identifying a periodic time interval for performing calibration; and generating an updated phase correction value for the first signal received at the first frequency according to the periodic time interval.

Aspect 6: The method of any of aspects 1 through 5, the tracking feed comprises a set of antennas offset from the antenna configured to receive the first signal at the first frequency, the set of antennas coupled with the second input via the second path.

Aspect 7: The method of any of aspects 1 through 6, the tracking feed comprises a tracking coupler coupled with the antenna and the first path to receive the first signal at the first frequency, the tracking coupler coupled with the second input via the second path.

Aspect 8: The method of any of aspects 1 through 7, wherein the first set of receiver calibration factors are associated with the first path; a second set of receiver calibration factors are associated with a second path; and a third input of the tracking receiver is coupled with the antenna to receive the first signal via the second path.

Aspect 9: The method of aspect 8, wherein the first set of receiver calibration factors are associated with a first type of polarization for signals received at the tracking receiver via the first path; and a second set of receiver calibration factors are associated with a second type of polarization for signals received at the tracking receiver via the second path.

Aspect 10: The method of any of aspects 1 through 9, further comprising: outputting, from the calibration output, a calibration signal at each frequency of a set of frequencies; receiving the output calibration signals at the first input and the second input; determining a first set of phase values associated with a first receiver of the tracking receiver, the first receiver coupled to both the first input and the second input; determining a second set of phase values associated with a second receiver of the tracking receiver, the second receiver coupled to both the first input and the second input; and generating the first set of receiver calibration factors based at least in part on the first set of phase values and the second set of phase values.

Aspect 11: The method of aspect 10, generating the first set of receiver calibration factors based at least in part on the first set of phase values and the second set of phase values comprises: determining a first slope and a first offset for a first line fitting a difference between the first set of phase values and the second set of phase values as a function of frequency; and determining a second slope and a second offset for a second line fitting the first set of phase values as a function of frequency; wherein the set of receiver calibration factors comprise at least the first slope, the first offset, the second slope, and the second offset.

Aspect 12: An apparatus for use in a satellite communication system, comprising a processor; memory coupled with the processor; and instructions stored in the memory and executable by the processor to cause the apparatus to perform a method of any of aspects 1 through 11.

Aspect 13: An apparatus for use in a satellite communication system, comprising at least one means for performing a method of any of aspects 1 through 11.

Aspect 14: A non-transitory computer-readable medium storing code for use in a satellite communication system, the code comprising instructions executable by a processor to perform a method of any of aspects 1 through 11.

Aspect 15: A system for tracking a satellite, comprising an antenna configured to receive a first signal at a first frequency, a tracking feed, and a tracking receiver, including a first input coupled with the antenna to receive the first signal via a first path, a second input coupled with the tracking feed to receive the first signal via a second path, a calibration output to output a calibration signal at a second frequency, the calibration output coupled with the first path via a first coupler and coupled with the second path via a second coupler, and a calibration component coupled with the first input, the second input, and the calibration output, wherein the calibration component is configured to store a first set of receiver calibration factors, determine a first phase value for the second frequency based at least in part on the calibration signal received at the first input and the second input at the second frequency, determine, from the first phase value, a second phase value associated with the first frequency based at least in part on a first phase offset between the first frequency and the second frequency, the first phase offset determined based at least in part on the first set of receiver calibration factors, and generate, based at least in part on the second phase value, a phase correction value for signals received at the first frequency.

Aspect 16: The method of aspect 15, wherein the tracking receiver further comprises at least a first receiver for the first signal at the first frequency and a second receiver for the calibration signal at the second frequency, and the calibration component is further configured to determine the second phase value associated with the first frequency based at least in part on a second phase offset between the first receiver for the first frequency and the second receiver for the first frequency, the second phase offset determined based at least in part on the first set of receiver calibration factors.

Aspect 17: The system of aspect 16, wherein the calibration component is configured to determine the second phase offset from the first setoff receiver calibration factors based at least in part on a slope, an offset, and a temperature.

Aspect 18: The system of any of aspects 15 through 17, further comprising selecting the second frequency for the calibration output based at least in part on the second frequency being different from the first frequency.

Aspect 19: The system of any of aspects 15 through 18, wherein the calibration component is further configured to select the second frequency for the calibration output based at least in part on the second frequency being different from the first frequency.

Aspect 20: The system of any of aspects 15 through 19, wherein the calibration component is further configured to identify a periodic time interval for performing calibration, and generate an updated phase correction value for the first signal received via the antenna at the first frequency according to the periodic time interval.

Aspect 21: The system of any of aspects 15 through 20, wherein the tracking feed comprises a set of antennas offset from the antenna configured to receive the first signal at the first frequency, the set of antennas coupled with the second input via the second path.

Aspect 22: The system of any of aspects 15 through 21, wherein the tracking feed comprises a tracking coupler coupled with the antenna and the first path to receive the first signal at the first frequency, the tracking coupler coupled with the second input via the second path.

Aspect 23: The system of any of aspects 15 through 22, wherein the first set of receiver calibration factors are associated with the first path, a second set of receiver calibration factors are associated with a third path, and a third input of the tracking receiver is coupled with the antenna to receive the first signal via the third path.

Aspect 24: The system of aspect 23, wherein the first set of receiver calibration factors are associated with a first type of polarization for signals received at the tracking receiver via the first path, and a second set of receiver calibration factors are associated with a second type of polarization for signals received at the tracking receiver via the second path.

Aspect 25: The system of any of aspects 15 through 24, further comprising a first amplifier component on the first path and coupled with the antenna and the first input of the tracking receiver, and a second amplifier component on the second path and coupled with the calibration output and the second input.

Aspect 26: The system of aspect 25, wherein the first amplifier component comprises a first low-noise block downconverter, and the second amplifier component comprises a second low-noise block downconverter.

Aspect 27: The system of aspect 25, wherein the calibration component is further configured to output, from the calibration output, a calibration signal at each frequency of a set of frequencies, receive the output calibration signals at the first input and the second input, determine a first set of phase values associated with a first receiver of the tracking receiver, the first receiver coupled to both the first input and the second input, determine a second set of phase values associated with a second receiver of the tracking receiver, the second receiver coupled to both the first input and the second input, and generate the first set of receiver calibration factors based at least in part on the first set of phase values and the second set of phase values.

Aspect 28: The system of aspect 27, wherein the calibration component is further configured to determine a first slope and a first offset for a first line fitting a difference between the first set of phase values and the second set of phase values as a function of frequency, and determine a second slope and a second offset for a second line fitting the first set of phase values as a function of frequency, wherein the set of receiver calibration factors comprise at least the first slope, the first offset, the second slope, and the second offset.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system for tracking a satellite, comprising:
   an antenna configured to receive a first signal at a first frequency;
   a tracking feed; and
   a tracking receiver, including
      a first input coupled with the antenna to receive the first signal via a first path;
      a second input coupled with the tracking feed to receive the first signal via a second path;
      a calibration output to output a calibration signal at a second frequency, the calibration output coupled with the first path via a first coupler and coupled with the second path via a second coupler; and
      a calibration component coupled with the first input, the second input, and the calibration output, wherein the calibration component is configured to:
      store a first set of receiver calibration factors;
      determine a first phase value for the second frequency based at least in part on the calibration signal received at the first input and the second input at the second frequency;
      determine, from the first phase value, a second phase value associated with the first frequency based at least in part on a first phase offset between the first frequency and the second frequency, the first phase offset determined based at least in part on the first set of receiver calibration factors; and
      generate, based at least in part on the second phase value, a phase correction value for signals received at the first frequency.

2. The system of claim 1, wherein
   the tracking receiver further comprises at least a first receiver for the first signal at the first frequency and a second receiver for the calibration signal at the second frequency; and the calibration component is further configured to determine the second phase value associated with the first frequency based at least in part on a second phase offset between the first receiver for the first frequency and the second receiver for the first frequency, the second phase offset determined based at least in part on the first set of receiver calibration factors.

3. The system of claim 2, wherein the calibration component is configured to determine the second phase offset from the first set of receiver calibration factors based at least in part on a slope, an offset, and a temperature.

4. The system of claim 1, wherein the calibration component is further configured to:
select the second frequency for the calibration output based at least in part on the second frequency being different from the first frequency.

5. The system of claim 1, wherein the calibration component is further configured to:
identify a periodic time interval for performing calibration; and
generate an updated phase correction value for the first signal received via the antenna at the first frequency according to the periodic time interval.

6. The system of claim 1, wherein the tracking feed comprises a set of antennas offset from the antenna configured to receive the first signal at the first frequency, the set of antennas coupled with the second input via the second path.

7. The system of claim 1, wherein the tracking feed comprises a tracking coupler coupled with the antenna and the first path to receive the first signal at the first frequency, the tracking coupler coupled with the second input via the second path.

8. The system of claim 1, wherein:
the first set of receiver calibration factors are associated with the first path;
a second set of receiver calibration factors are associated with a third path; and
a third input of the tracking receiver is coupled with the antenna to receive the first signal via the third path.

9. The system of claim 8, wherein:
the first set of receiver calibration factors are associated with a first type of polarization for signals received at the tracking receiver via the first path; and
a second set of receiver calibration factors are associated with a second type of polarization for signals received at the tracking receiver via the second path.

10. The system of claim 1, further comprising:
a first amplifier component on the first path and coupled with the antenna and the first input of the tracking receiver; and
a second amplifier component on the second path and coupled with the calibration output and the second input.

11. The system of claim 10, wherein:
the first amplifier component comprises a first low-noise block downconverter; and
the second amplifier component comprises a second low-noise block downconverter.

12. The system of claim 1, wherein the calibration component is further configured to:
output, from the calibration output, a calibration signal at each frequency of a set of frequencies;
receive the output calibration signals at the first input and the second input;

determine a first set of phase values associated with a first receiver of the tracking receiver, the first receiver coupled to both the first input and the second input;
determine a second set of phase values associated with a second receiver of the tracking receiver, the second receiver coupled to both the first input and the second input; and
generate the first set of receiver calibration factors based at least in part on the first set of phase values and the second set of phase values.

13. The system of claim 12, wherein the calibration component is further configured to:
determine a first slope and a first offset for a first line fitting a difference between the first set of phase values and the second set of phase values as a function of frequency; and
determine a second slope and a second offset for a second line fitting the first set of phase values as a function of frequency;
wherein the first set of receiver calibration factors comprise at least the first slope, the first offset, the second slope, and the second offset.

14. A method for use in a satellite communication system, comprising:
receiving, at a first input of a tracking receiver, a first signal at a first frequency via a first path and a calibration signal at a second frequency;
receiving, at a second input of the tracking receiver, the first signal at the first frequency via a second path and the calibration signal at the second frequency;
outputting the calibration signal to a first coupler coupled with the first path and a second coupler coupled with the second path;
determining a first phase value for the second frequency based at least in part on the calibration signal received at the first input and the second input at the second frequency;
determining, from the first phase value, a second phase value associated with the first frequency based at least in part on a first phase offset between the first frequency and the second frequency, the first phase offset determined based at least in part on a first set of receiver calibration factors; and
generating, based at least in part on the second phase value, a phase correction value for signals received at the first frequency.

15. The method of claim 14, wherein:
the tracking receiver comprises at least a first receiver for the first signal at the first frequency and a second receiver for the calibration signal at the second frequency; and
the second phase value associated with the first frequency is determined based at least in part on a second phase offset between the first receiver for the first frequency and the second receiver for the first frequency, the second phase offset determined based at least in part on the first set of receiver calibration factors.

16. The method of claim 15, further comprising:
determining the second phase offset from the first set of receiver calibration factors based at least in part on a slope, an offset, and a temperature.

17. The method of claim 14, further comprising:
selecting the second frequency for the calibration output based at least in part on the second frequency being different from the first frequency.

18. The method of claim 14, further comprising:
identifying a periodic time interval for performing calibration; and
generating an updated phase correction value for the first signal received at the first frequency according to the periodic time interval.

19. The method of claim 14, wherein the tracking receiver is coupled with a tracking feed that is associated with an antenna and comprises a set of antennas (302-*a*, 302-*b*, 302-*c*, 302-*d*) offset from the antenna configured to receive the first signal at the first frequency, the set of antennas (302-*a*, 302-*b*, 302-*c*, 302-*d*) coupled with the second input via the second path.

20. The method of claim 14, wherein the tracking receiver is coupled with a tracking feed that comprises a tracking coupler coupled with an antenna and the first path to receive the first signal at the first frequency, the tracking coupler coupled with the second input via the second path.

21. The method of claim 14, wherein:
the first set of receiver calibration factors are associated with the first path;
a second set of receiver calibration factors are associated with a second path; and
a third input of the tracking receiver is coupled with an antenna to receive the first signal via the second path.

22. The method of claim 21, wherein:
the first set of receiver calibration factors are associated with a first type of polarization for signals received at the tracking receiver via the first path; and
a second set of receiver calibration factors are associated with a second type of polarization for signals received at the tracking receiver via the second path.

23. The method of claim 14, further comprising:
outputting, from the calibration output, a calibration signal at each frequency of a set of frequencies;
receiving the output calibration signals at the first input and the second input;
determining a first set of phase values associated with a first receiver of the tracking receiver, the first receiver coupled to both the first input and the second input;
determining a second set of phase values associated with a second receiver of the tracking receiver, the second receiver coupled to both the first input and the second input; and
generating the first set of receiver calibration factors based at least in part on the first set of phase values and the second set of phase values.

24. The method of claim 23, wherein generating the first set of receiver calibration factors based at least in part on the first set of phase values and the second set of phase values comprises:
determining a first slope and a first offset for a first line fitting a difference between the first set of phase values and the second set of phase values as a function of frequency; and
determining a second slope and a second offset for a second line fitting the first set of phase values as a function of frequency;
wherein the first set of receiver calibration factors comprise at least the first slope, the first offset, the second slope, and the second offset.

* * * * *